(12) United States Patent
Fine et al.

(10) Patent No.: US 10,865,935 B2
(45) Date of Patent: Dec. 15, 2020

(54) APPARATUS FOR HOLDING A PORTABLE ELECTRONIC DEVICE

(71) Applicants: Seth Fine, Plantation, FL (US); Michael Furshman, Park City, UT (US)

(72) Inventors: Seth Fine, Plantation, FL (US); Michael Furshman, Park City, UT (US)

(*) Notice: Subject to any disclaimer, the term of this patent is extended or adjusted under 35 U.S.C. 154(b) by 0 days.

(21) Appl. No.: 16/624,475

(22) PCT Filed: Jun. 7, 2019

(86) PCT No.: PCT/US2019/036034
§ 371 (c)(1),
(2) Date: Dec. 19, 2019

(87) PCT Pub. No.: WO2019/236987
PCT Pub. Date: Dec. 12, 2019

(65) Prior Publication Data
US 2020/0124227 A1 Apr. 23, 2020

Related U.S. Application Data

(60) Provisional application No. 62/681,890, filed on Jun. 7, 2018.

(30) Foreign Application Priority Data

Jun. 7, 2018 (CA) ..................................... 3007549

(51) Int. Cl.
*F16M 11/10* (2006.01)
*F16M 11/20* (2006.01)
*H04M 1/04* (2006.01)

(52) U.S. Cl.
CPC ......... *F16M 11/10* (2013.01); *F16M 11/2021* (2013.01); *H04M 1/04* (2013.01)

(58) Field of Classification Search
CPC combination set(s) only.
See application file for complete search history.

(56) References Cited

U.S. PATENT DOCUMENTS 3,089,597 A 5/1963 Kaplan
6,418,010 B1 7/2002 Sawyer
(Continued)

FOREIGN PATENT DOCUMENTS

CN 105644457 A 6/2016
CN 105799603 A 7/2016
(Continued)

OTHER PUBLICATIONS

Patent Cooperation Treaty (PCT), International Search Report and Written Opinion for Application PCT/US2019/036034 filed Jun. 7, 2019, dated Aug. 16, 2019, International Searching Authority, US.
(Continued)

*Primary Examiner* — Monica E Millner
(74) *Attorney, Agent, or Firm* — Brion Raffoul

(57) ABSTRACT

A device holder that may be used as a freestanding device or may hang from a surface. The device holder allows the portable electronic device (PED) to be adjusted to multiple viewing angles. The device holder includes three (3) general components: a connector that hangs or hooks onto a surface, a support wall to lean the PED against, and a base to support the bottom of the PED. The three (3) components may be coupled to each other with hinge and/or linking mechanisms. The hinge and/or linking mechanisms may be removable, such that the components may couple and decouple from each other. The hinge or linking mechanisms may allow the angles between the components to be adjusted
(Continued)

and/or the device holder to fold flat. The device holder may include securing means to secure the PED against the support wall.

20 Claims, 22 Drawing Sheets

(56) References Cited

U.S. PATENT DOCUMENTS

| | | | |
|---|---|---|---|
| 7,561,415 B2 | 7/2009 | Liou et al. | |
| 8,727,295 B2* | 5/2014 | Peng | F16M 13/00 |
| | | | 248/346.06 |
| 8,876,070 B2* | 11/2014 | Liu | F16M 11/2021 |
| | | | 248/188.6 |
| 9,167,706 B2 | 10/2015 | Holmstrom | |
| D829,725 S * | 10/2018 | Luo | D14/447 |
| D839,869 S * | 2/2019 | Wang | D14/253 |
| D847,142 S | 4/2019 | Furshman et al. | |
| 2002/0125386 A1 | 9/2002 | Pook | |
| 2003/0213646 A1 | 11/2003 | Gallion | |
| 2007/0075204 A1 | 4/2007 | Fertil | |
| 2009/0230161 A1 | 9/2009 | Emsky | |
| 2011/0278885 A1 | 11/2011 | Procter et al. | |
| 2012/0074286 A1* | 3/2012 | Chou | F16M 13/00 |
| | | | 248/346.03 |
| 2012/0138494 A1 | 6/2012 | Thomas | |
| 2013/0181106 A1* | 7/2013 | Lin | F16M 13/00 |
| | | | 248/463 |
| 2014/0048662 A1 | 2/2014 | Ferris | |
| 2014/0352125 A1 | 12/2014 | Duran | |
| 2015/0034686 A1 | 2/2015 | Holmstrom | |
| 2015/0052854 A1 | 2/2015 | Diebel et al. | |
| 2015/0108798 A1 | 4/2015 | Boyer, Jr. | |
| 2015/0288405 A1* | 10/2015 | Gygax | H04M 1/04 |
| | | | 455/575.1 |
| 2016/0039349 A1 | 2/2016 | Casagrande | |
| 2016/0257404 A1 | 9/2016 | Ferris | |
| 2017/0088265 A1 | 3/2017 | Brick | |
| 2017/0237843 A1 | 8/2017 | Ackeret et al. | |
| 2017/0349200 A1 | 12/2017 | Winton et al. | |
| 2018/0111690 A1 | 4/2018 | Zheng et al. | |

FOREIGN PATENT DOCUMENTS

| | | |
|---|---|---|
| CN | 106627402 A | 5/2017 |
| DE | 102011075621 A1 | 11/2011 |
| GB | 2100459A A | 12/1982 |
| GB | 2502948 A | 12/2013 |
| GB | 2535259 B | 2/2017 |
| KR | 20170067613 | 6/2017 |
| WO | 2012/138699 A1 | 10/2012 |
| WO | 2016198828 A1 | 12/2016 |

OTHER PUBLICATIONS

"Tablethookz—Create Your Own In-Flight Seatback Entertainment". Tablethookz, 2018, https://tablethookz.com/. Accessed May 15, 2018, 4 pages.

"Touch Screen for Raspberry Pi 3 Kit,Quimat 3.5 Inch 320×480 Resolution TFT LCD Display With Protective Case for Raspberry Pi 3 Model B, Pi 2 Model B & Pi Model B With Protective Case—Clickymicky". Clickymicky.Com, 2018, http://clickymicky.com/touch-screen-for-raspberry-pi-3-kitquimat-3-5-inch-320x480-resolution-tft-lcd-display-with-protective-case-for-raspberry-pi-3-model-b-pi-2-model-b-pi-model-b-with-protective-case/. Accessed May 15, 2018, 24 pages.

"Skomet Multi-Angle Adjustable Phone Stand (Red)". English, 2018, http://store.cavaraty.com/skomet-multi-angle-adjustable-phone-stand-red.html. Accessed May 15, 2018, 2 pages.

"$2.41 Adjustable Multi-Angle Holder Stand for Cellphones / Tablet Pcs—Foldable / 5-Position / Black at Fasttech—Worldwide Free Shipping". Fasttech—Cool Gadgets and Electronics, 2018, https://www.fasttech.com/product/2318303-adjustable-multi-angle-holder-stand-for. Accessed May 15, 2018, 2 pages.

"Aszune Foldable Multi-Angle Phone Stand Desk Portable Lazy Holder Mount for Samsung Xiaomi Tablet". Www.Banggood.com, 2018, https://www.banggood.com/ASZUNE-Foldable-Multi-angle-Phone-Stand-Desk-Portable-Lazy-Holder-Mount-for-Samsung-Xiaomi-Tablet-p-1153560.html?cur_warehouse=CN. Accessed May 15, 2018, 9 pages.

Amazon.com, 2018, https://www.amazon.com/Digital-Tablet-Travel-Airplane-Blue/dp/B00129UXLW. Accessed May 15, 2018, 7 pages.

"The Airhook—Campers Village". Campers-Village.Com, 2018, http://www.campers-village.com/brand/The-Airhook/. Accessed May 15, 2018, 2 pages.

Amazon.com, 2018, https://www.amazon.com/Clamp-Champion-Pro-Universal-Smartphone/dp/B00P1HU2WI. Accessed May 15, 2018, 8 pages.

"Arctic Flight—Let Your Ipad Fly!". Kickstarter, 2018, https://www.kickstarter.com/projects/501583891/arctic-flight-let-your-ipad-fly. Accessed May 15, 2018, 9 pages.

"Hate Cramped Airplanes? The Airhook Holds Your Tablet and a Drink". Digital Trends, 2018, https://www.digitaltrends.com/mobile/hate-cramped-airplanes-the-airhook-holds-your-tablet-and-a-drink/. Accessed May 15, 2018, 7 pages.

"23 Gadgets That Promise to Make Flying Better". The Telegraph, 2018, https://www.telegraph.co.uk/travel/galleries/essential-gadgets-to-make-air-travel-better/airhook/. Accessed May 15, 2018, 11 pages.

Amazon.com, 2018, https://www.amazon.com/Lockjaww-Flight-Device-Android-Tablets/dp/B01DFMECBC. Accessed May 15, 2018, 9 pages.

"Iphone Hook for Airplanes by Jgrout". Makerbot, 2018, https://www.makerbotcom/media-center/2011/05/03/iphone-hook-for-airplanes-by-jgrout. Accessed May 15, 2018, 2 pages.

ISR and Written Opinion dated Jun. 7, 2019 for PCT International Application No. PCT/US19/36034, 99 pages.

International Preliminary Report on Patentability for PCT International Application No. PCT/GB2016/01271, 7 pages.

Amazon.com AirClipZ—Travel Holder for Airplane Tray Table Compatible with Most Digital Tablets and Apple iPads in White https://www.amazon.com/AirClipZ-Airplane-Compatible-Digital-Tablets/dp/B00I29UXLW Accessed Feb. 19, 2020. 1 page.

* cited by examiner

ID device in a visible and usable manner.

APPARATUS FOR HOLDING A PORTABLE ELECTRONIC DEVICE

CROSS-REFERENCE TO RELATED APPLICATION

This application is a 35 U.S.C. 371 national stage filing of PCT Application No. PCT/US2019/036034 filed on Jun. 7, 2019, entitled "APPARATUS FOR HOLDING A PORTABLE ELECTRONIC DEVICE," which claims priority to U.S. Provisional Patent Application No. 62/681,890, filed on Jun. 7, 2018 and Canadian Application No. 3,007,549 filed on Jun. 7, 2018, which are all incorporated herein by reference in their entirety.

TECHNICAL FIELD

The present invention relates to an apparatus for holding a portable electronic device. More specifically, the present invention relates to an apparatus that is suitable for securing a portable electronic device in a visible and usable manner.

BACKGROUND

The use of portable electronic devices (PEDs) has become ubiquitous in modem society. Many individuals commonly use PEDs for consuming multimedia content and for performing other tasks, such as video calling. As many individuals prefer to view content and perform tasks on PEDs in a hands-free manner, support apparatuses are required to hold PEDs upright at various preferred viewing angles.

Some PED support apparatuses are freestanding apparatuses that provide a back support for the PED to lean on while independently standing on a relatively flat surface. Alternatively, some PED support apparatuses can hang off of a surface when a stable horizontal surface is not available. Furthermore, some of these PED support apparatuses can be adjusted to hold the PED at different angles.

However, the existing freestanding support apparatuses cannot be adapted to hang on a surface. Furthermore, the known hanging support apparatuses cannot be adapted to be a freestanding support apparatus.

There is therefore a need to overcome the shortcomings of the prior art by providing a freestanding support apparatus that is also capable of hanging from the back of a surface.

SUMMARY

The present invention provides a device holder that may be used as a freestanding device or may hang from a surface. The device holder allows the portable electronic device (PED) to be adjusted to multiple viewing angles. The device holder is comprised of three (3) general components: a connector that hangs or hooks onto a surface, a support wall to lean the PED against, and a base to support the bottom of the PED.

The three (3) components may be operatively coupled to each other with hinge and/or linking mechanisms. The hinge and/or linking mechanisms may be removable, such that the components may couple and decouple from each other. The hinge or linking mechanisms may allow the angles between the components to be adjusted and/or the device holder to fold flat. The device holder may include securing means to secure the PED against the support wall.

In a first aspect, the present invention provides a device for holding a portable electronic device, the device comprising: a connector; a support wall having a first end and a second end, wherein the connector is coupled to the first end of the support wall; a base having a first base end and a second base end, wherein the first base end of the base is coupled to the second end of the support wall such that the base is extending in an opposite direction from the connector; and at least one support element, wherein the at least one support element is coupled to the base on a front face, the front face being a surface facing the support wall.

Various combinations of the above aspects, as well as other features and advantages of the present invention will become apparent from the description, the drawings, and the claims.

BRIEF DESCRIPTION OF THE DRAWINGS

The present invention will now be described by reference to the following figures, in which identical reference numerals refer to identical elements and in which.

DETAILED DESCRIPTION

The terms "coupled" and "connected", along with their derivatives, may be used herein. It should be understood that these terms are not intended as synonyms for each other. Rather, in particular embodiments, "connected" may be used to indicate that two or more elements are in direct physical contact with each other. "Coupled" may be used to indicated that two or more elements are in either direct or indirect (with other intervening elements between them) physical contact with each other, or that the two or more elements co-operate or interact with each other (e.g. as in a cause and effect relationship).

Figure 1:
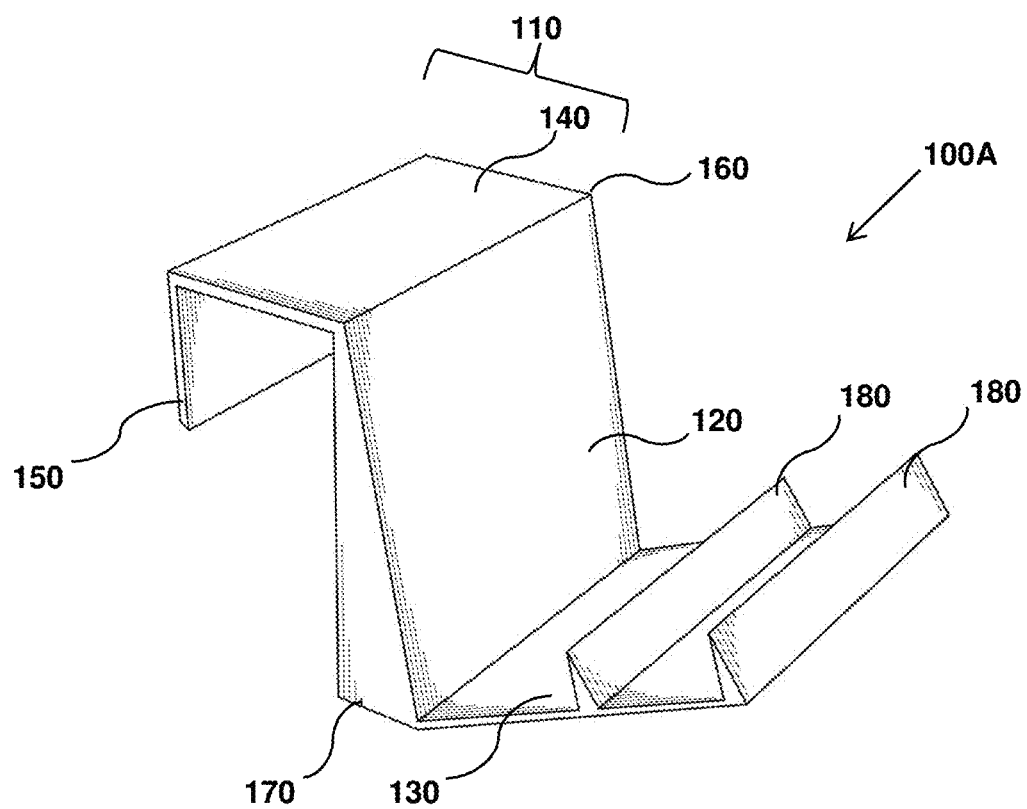
FIG. 1 is a perspective view of a device holder according to a first embodiment of the present invention.

FIG. 1 shows a perspective view of a device holder 100 according to a first embodiment. As may be seen, the device holder 100A has a connector 110, a support wall 120 and a base 130.

The connector 110 comprises a top portion 140 that is coupled to and protrudes out from the support wall 120. The top portion 140 is coupled to a lip portion 150. The lip portion 150 extends away from the top portion 140 in generally the same direction as the support wall 120, such that the lip portion 150 and the support wall 120 are facing each other. Accordingly, the top portion 140, the lip portion 150, and the support wall 120, collectively, form a channel. The channel is shaped and sized to fit over an object or surface to hang or hook the device holder 100A on.

The support wall 120 provides a surface to lean a PED against when the device holder 100A is in use. The support wall 120 shown in FIG. 1 forms a triangular prism with an acute angle at or near the top end 160 of the support wall 120. Alternatively, the support wall may form a wall with a uniform thickness. The skilled artisan would understand that a thicker base at the bottom end 170 of the support wall 120 provides more stability for when the device holder 100A is used as a freestanding device holder.

The base 130 is coupled to the support wall 120 near the bottom end 170 of the support wall 120. The base 130 is protruding in a generally opposite direction from the connector 110. The base 130 may be coupled to the support wall 120 at a perpendicular or near perpendicular angle. However, the base 130 may angle away from the support wall 120 at either an acute or obtuse angle with the support wall 120. In a preferred embodiment, the base 130 and the bottom end 170 of the support wall 120 are coupled in a planar manner, such that the bottom surface of the base 130 and the bottom end 170 of the support wall 120 form a level surface (for example, see FIG. 3).

The base 130 shown in FIG. 1 is a planar surface with two (2) support elements 180 protruding from the base 130. However, a skilled artisan would understand that the base 130 does not need to be a planar surface. The support elements 180 protrude out from the front surface of the base 130 (i.e., the side that faces the support wall 120), such that the PED may rest against one of the support elements 180. However, the support elements 180 may also be divots or slots that the PED may fit inside. The support elements 180 are shaped to hold and/or support the PED when the PED is leaning against the support wall 120. In a further embodiment, the front surface of the base 130 (i.e., the side that faces the support wall 120) and/or the support elements 180 may be coated with a non-slip adhesive spray or with a rubber pad secured with an adhesive backing to the front surface of the base 130. In a further embodiment, the bottom surface of the base 130 may be coated with a non-slip adhesive spray or with a rubber pad secured with an adhesive backing to the bottom surface of the base 130.

Figure 2:
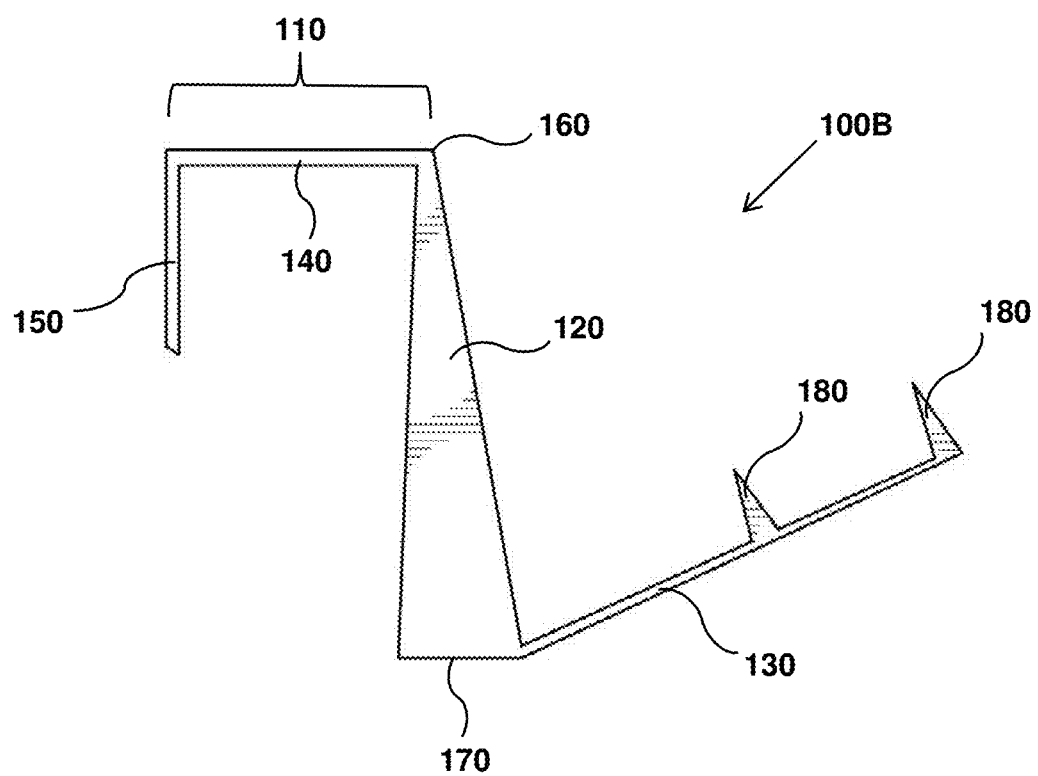
FIG. 2 is a side view of a device holder according to a second embodiment of the present invention.

FIG. 2 shows a side view of a device holder 100B according to a second embodiment. The device holder 100B similarly has a connector 110 comprised of a top portion 140 and a lip portion 150, a support wall 120 with a top end 160 and a bottom end 170, and a base 130 with two (2) support elements 180. However, the angle between the support wall 120 and the base 130 in device holder 100B is smaller. This smaller angle helps facilitate the connector 110 hooking onto a surface that is not perpendicular to the ground surface. For example, the connector 110 would easily be able to hook onto the back of an airplane chair or tray table, when the chair has been moved into a reclined position, and the position of the base 130 would remain relatively parallel or near parallel to the ground surface.

Figure 3:
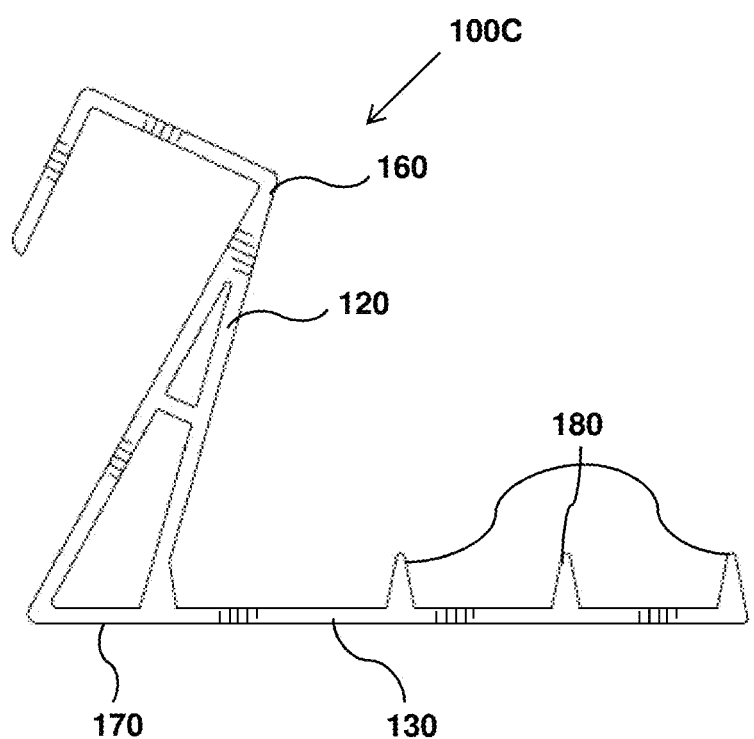
FIG. 3 is a side view of a device holder according to a third embodiment of the present invention.

FIG. 3 shows a side view of a device holder 100C according to a third embodiment. The device holder 100C is similar to device holders 100A and 100B; however, in device holder 100C, the bottom surface of the base 130 and the bottom end 170 of the support wall 120 form a level, planar surface. This level surface allows the device holder 100C to act as a freestanding device holder with both the bottom surface of the base 130 and the bottom end 170 of the support wall 120 coming into contact with the surface the device holder 100C is resting upon.

The device holder 100C has three (3) support elements 180 to adjust the PED at three (3) different angles. Specifically, the device holder 100C may hold the PED at multiple viewing angles when supported by the top end 160 of the support wall 120 or by the middle of the support wall 120. The multiple viewing angles are possible by resting the PED against different support elements 180. The PED may be, without limitation, a mobile phone, a tablet, an e-reader, a notebook computer, or a laptop computer.

When the device holder 100C is hooked onto a surface, the device holder 100C is partially stabilized on the surface by the bottom end 170 of the support wall 120.

Figure 4:
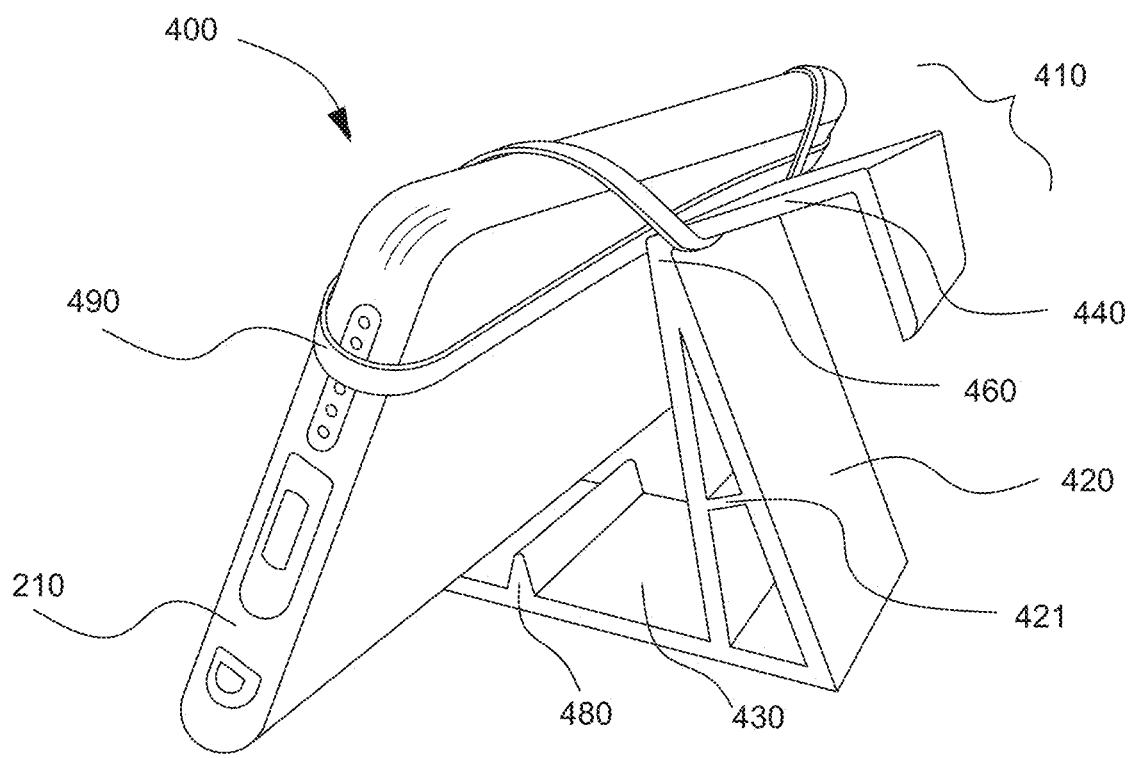
FIG. 4 is a perspective, side view of a device holder according to a fourth embodiment of the present invention.

FIG. 4 shows a perspective view of a device holder 400 according to a fourth embodiment. The device holder 400 has a connector 410, a support wall 420 and a base 430. The device holder 400 is shown as a freestanding holder; however, the device holder 400 is capable of hanging from or hooking onto a surface.

The support wall 420 provides a surface to lean a PED 210 against when the device holder 400 is in use. The support wall 420 forms a triangular prism with an acute angle at or near the top end 460 of the support wall 420. The triangular prism of the support wall 420 is hollow with a single internal support bar 421 extending between the interior surfaces of the support wall 420. In another embodiment, the triangular prism may have two (2) or more internal support bars 421.

The base 430 has support elements 480 that protrude out from the front surface of the base 430 (i.e., the side that faces the support wall 420), such that the PED 210 may rest against a support element 480. The PED 210 may also be removably secured to the device holder 400 by one or more securing means 490.

The securing means 490 may be coupled to the top end 460 of the support wall 420 by wrapping underneath the top portion 440 of the connector 410. Alternatively, the securing means 490 may be coupled to the support wall 420 by extending through the hollow portions of the support wall 420. In another embodiment, one or more securing means 490 may be coupled to either side of the top end 460 of the support wall 420 or the top portion 440 of the connector 410.

The PED 210 is secured to the device holder 400 with securing means 490. The upper corners of the PED 210 are individually secured to the device holder 400 on either side of the securing means 490. The lower side of the PED 210 rests against one of the support elements 480.

The securing means 490 may be, without limitation, elastic, a bungee cord, a rubber cord, a strap, or any similar structural element formed either separate from the device holder or integrated with the device holder and that may be utilized to quickly secure the PED in place within the device holder. The securing means 490 may have a clip, loop or other attachment mechanism that includes any similar structural element for quickly connecting the securing means on either side of the device holder so as to secure both sides of the PED 210 to the device holder 400. The skilled artisan would understand that the securing means 490 may be used with any of the embodiments of the present invention.

Figure 5:
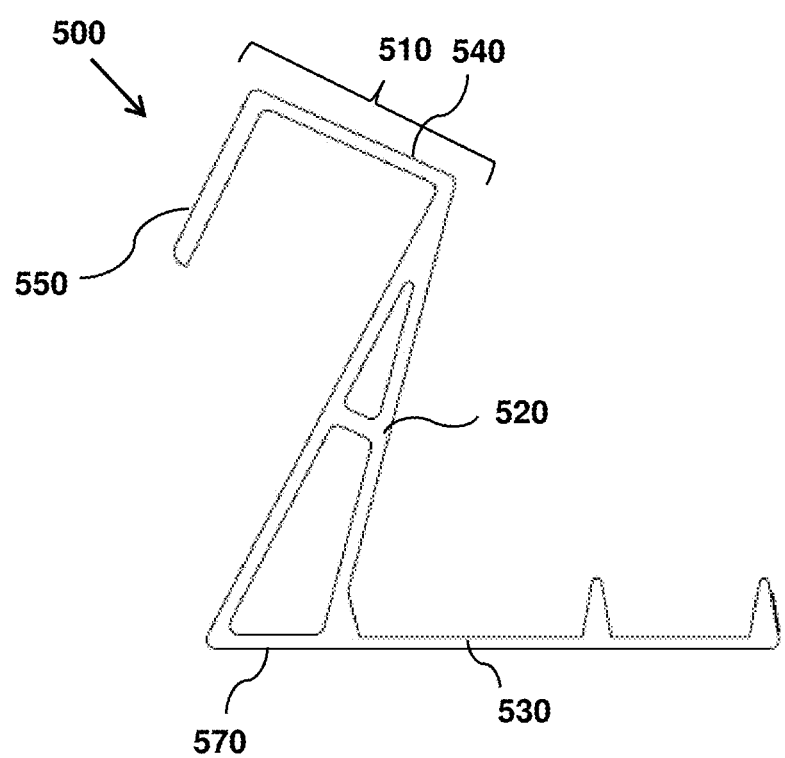
FIG. 5 shows a side view of a device holder according to a fifth embodiment of the present invention.

FIG. 5 shows a side view of a device holder 500 according to a fifth embodiment. The device holder 500 has a connector 510, a support wall 520, and a base 530.

The connector 510 comprises a top portion 540 that is coupled to the support wall 520 at one end and a lip portion 550 at the other end. The top portion 540 may be coupled to the support wall 520 and/or the lip portion 550 with hinge mechanisms (not shown).

When the top portion 540 is operatively coupled to the support wall 520 with a hinge mechanism (not shown), the connector 510 may fold such that the lip portion 550 rests against the outer surface of the support wall 520 (i.e., the side of the support wall 520 that faces away from the base 530). Alternatively, the connector 510 may fold such that the top portion 540 rests against the inner surface of the support wall 520 (i.e., the side of the support wall 520 that faces towards the base 530).

When the top portion 540 is operatively coupled to the lip portion 550 with a first and second hinge mechanism (not shown), the lip portion 550 may fold against either surface of the top portion 540. When the top portion 540 is coupled to both the support wall 520 and the lip portion 550 with a hinge mechanism (not shown), the connector 510 may fold flat against either surface of the support wall 520.

Furthermore, the support wall 520 may be operatively coupled to the base 530 with a hinge mechanism (not shown). When the support wall 520 and the base 530 are coupled with a hinge mechanism (not shown), the base 530 may fold flat against either surface of the support wall 520.

Figure 6:
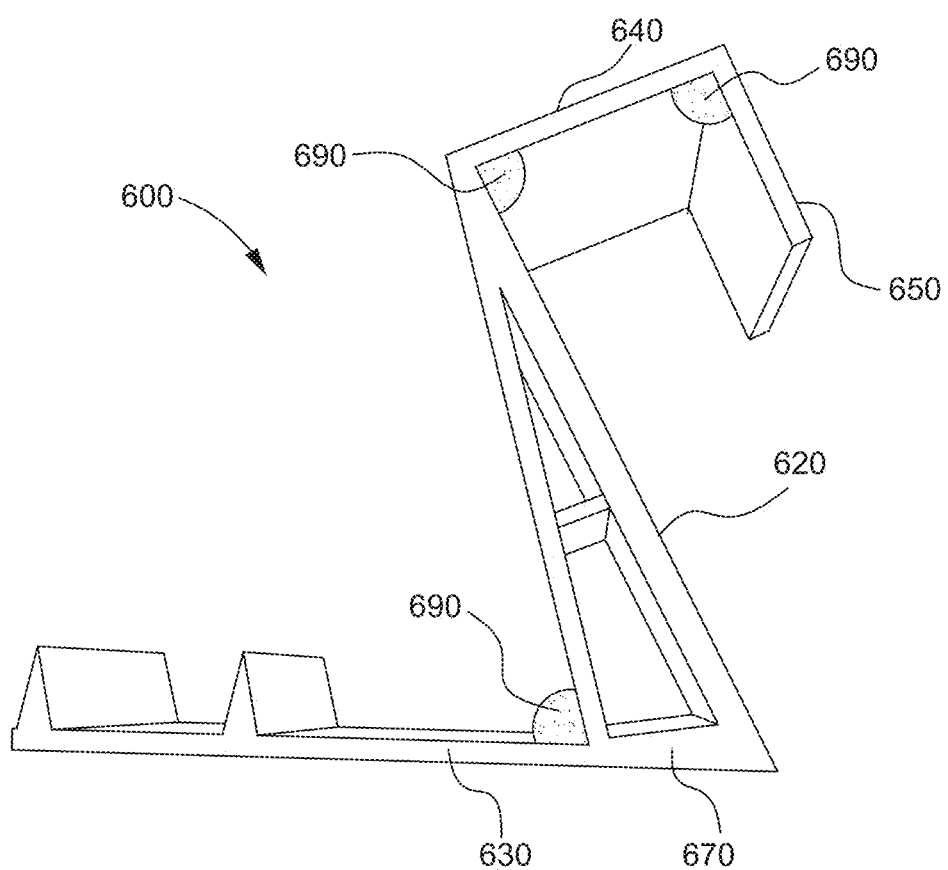
FIG. 6 shows a side view of a device holder according to a sixth embodiment of the present invention.

FIG. 6 shows a device holder 600 according to a sixth embodiment of the present invention. The device holder 600 comprises a support wall 620, a base 630, a top portion 640 and a lip portion 650. Device holder 600 further comprises hinge mechanisms 690 that couple the various parts of the device holder 600 to each other. The top portion 640 is coupled to both the support wall 620 and the lip portion 650 with hinge mechanisms 690. Furthermore, the support wall 620 is coupled to the base 630 with a hinge mechanism 690. When each of the four (4) parts are coupled to each other with hinge mechanisms 690, the device holder 600 is capable of folding flat for easier storage and transport (for example, see FIG. 7).

The hinge mechanism 690 may be, without limitation, a butt hinge, butterfly hinge, flush hinge, barrel hinge, concealed hinge, continuous hinge, piano hinge, pivot hinge, ball bearing hinge, plain bearing hinge, or wraparound hinge.

Figure 7:
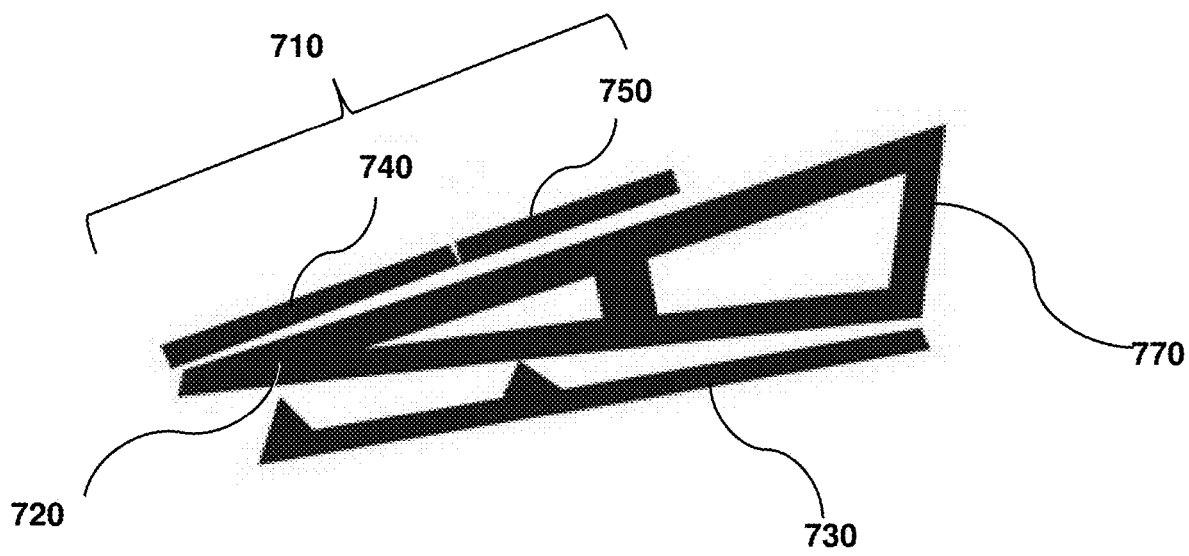
FIG. 7 shows a side view of a device holder according to a seventh embodiment of the present invention.

FIG. 7 shows a side view of a folded configuration of a device holder 700 according to a seventh embodiment. As may be seen, the connector 710 folds flat against the outer surface of the support wall 720 (i.e., the side of the support wall 720 that faces away from the base 730). Furthermore, the base 730 folds flat against the inner surface of the support wall 720 (i.e., the side of the support wall 720 that faces towards the base 730). The device holder 700 may also fold such that the connector 710 folds flat against the inner surface of the support wall 720. In other configurations, the lip portion 750 may fold flat against either side of the top portion 740 and the top portion 740 may fold flat against either side of the support wall 720.

In a further embodiment, the hinge mechanism between the support wall 720 and the base 730 may be adjustable, such that the base 730 may be fixed at different positions to achieve different viewing angles. In another embodiment, the support wall 720 and the base 730 are coupled with a removable hinge mechanism to allow the base 730 to be replaceable with a longer and/or wider base 730. Accordingly, the longer and/or wider base 730 may be used to hold and support larger PEDs, such as a tablet or an e-reader.

Figure 8:
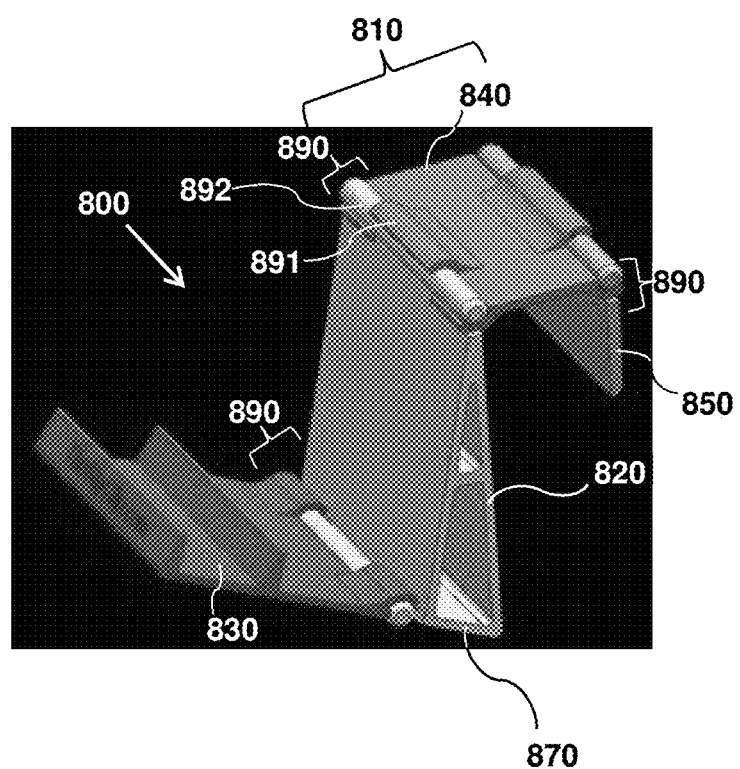
FIG. 8 is a perspective view of a device holder according to an eighth embodiment of the present invention.

FIG. 8 shows a perspective view of a device holder 800 according to an eighth embodiment. The device holder 800 has a connector 810, a support wall 820 and a base 830.

The connector 810 comprises a top portion 840 and a lip portion 850. The top portion 840 is coupled to both the support wall 820 and the lip portion 850 with hinge mechanisms 890. Furthermore, the support wall 820 is coupled to the base 830 with a hinge mechanism 890.

The hinge mechanisms 890 are each comprised of a barrel 891 and a pin 892. The barrel 891 forms a cavity that is shaped and sized to receive the pin 892. The pin 892 is held inside the barrel 891 such that the barrel 891 may rotate around the pin 892.

In FIG. 8, the pin 892 is held inside the barrel by three (3) tabs (i.e., the barrel 891 on the hinge mechanism 890 supports the pin 892 on three (3) sides). Two (2) of these tabs extend from each end of the longitudinal edge of the top portion 840, forming a gap between the two (2) tabs. One side of the pin 892 rests against the two (2) tabs. The third tab is located on the other side of the pin 892 in the gap between the first two (2) tabs. The third tab holds the pin 892 against the first two (2) tabs. However, a skilled artisan would understand that the barrel 891 may extend the entire length of the pin 892 on either side, or another configuration that allows the barrel 891 to rotate around the pin 892.

In a further embodiment, the barrel 891 may be adjusted in length to accommodate different pin 892 lengths (not shown). This adjustable hinge mechanism 890 may therefore accommodate different widths of the support wall 820, the base 830, the top portion 840, and/or the lip portion 850.

Figure 9A:
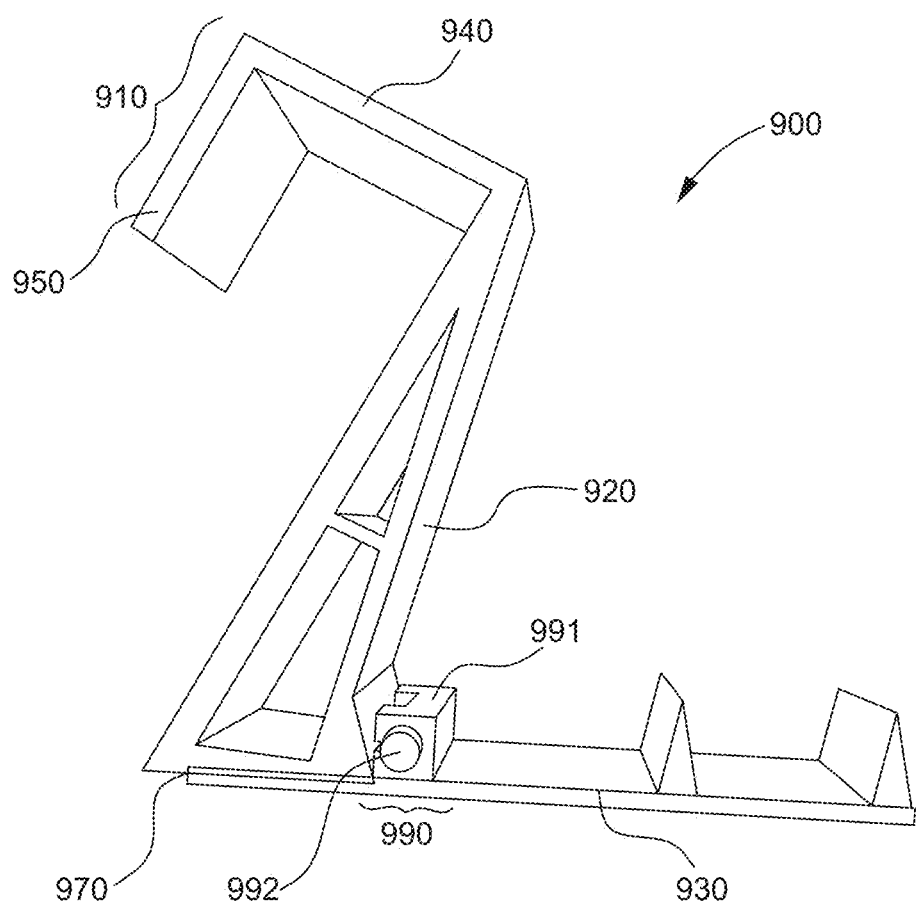
FIG. 9A shows a side view of a device holder according to a ninth embodiment of the present invention.

FIG. 9A shows a side view of a device holder 900 according to a ninth embodiment. Similar to other embodiments, the device holder 900 has a connector 910, a support wall 920, and a base 930.

The base 930 is removably coupled to the support wall 920 with a hinge mechanism 990. The hinge mechanism 990 may be coupled to the end of the base 930 that is adjacent to the support wall 920. Alternatively, as shown in FIG. 9A, the hinge mechanism 990 may be coupled to the front surface of the base 930 (i.e., the side that faces the support wall 920) at a point that is between the two ends of the base 930; as such, the end of the base 930 that is adjacent to the support wall 920 extends underneath the bottom end 970 of the support wall 920. Accordingly, the bottom end 970 of the support wall 920 may rest flat on the front surface of the base 930 when the support wall 920 and the base 930 are coupled with a hinge mechanism 990.

The hinge mechanism 990 comprises a barrel 991 and a pin 992. The barrel 991 forms a cavity that is shaped and sized to receive the pin 992. The pin 992 is held inside the barrel 991 such that the barrel 991 may rotate around the pin 992.

Figure 9B:
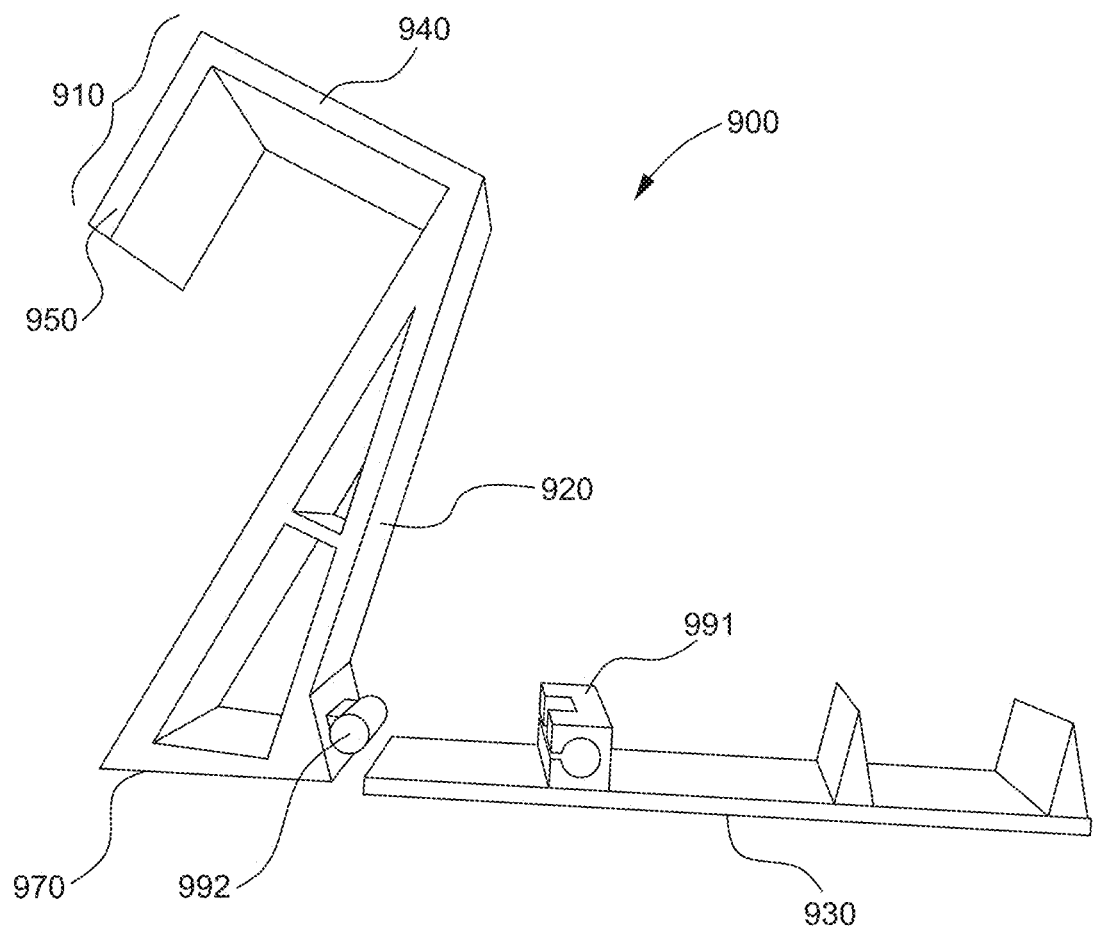
FIG. 9B shows a side view of the device holder shown in FIG. 9A when the device holder is decoupled.

As shown in FIG. 9B, the support wall 920 and the base 930 may be decoupled when the pin 992 is removed from inside the barrel 991.

Figure 9C:
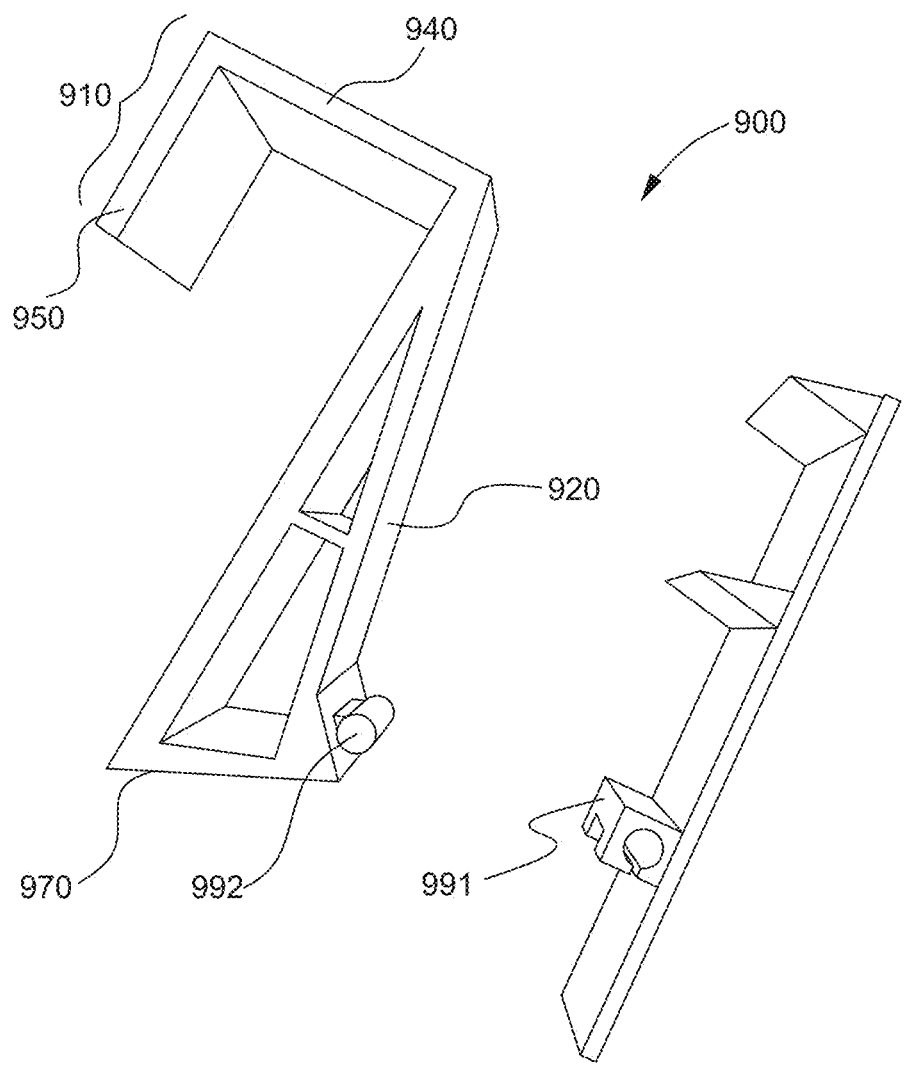
FIG. 9C shows a side view of the rotating function of the device holder shown in FIG. 9A.
Figure 9D:
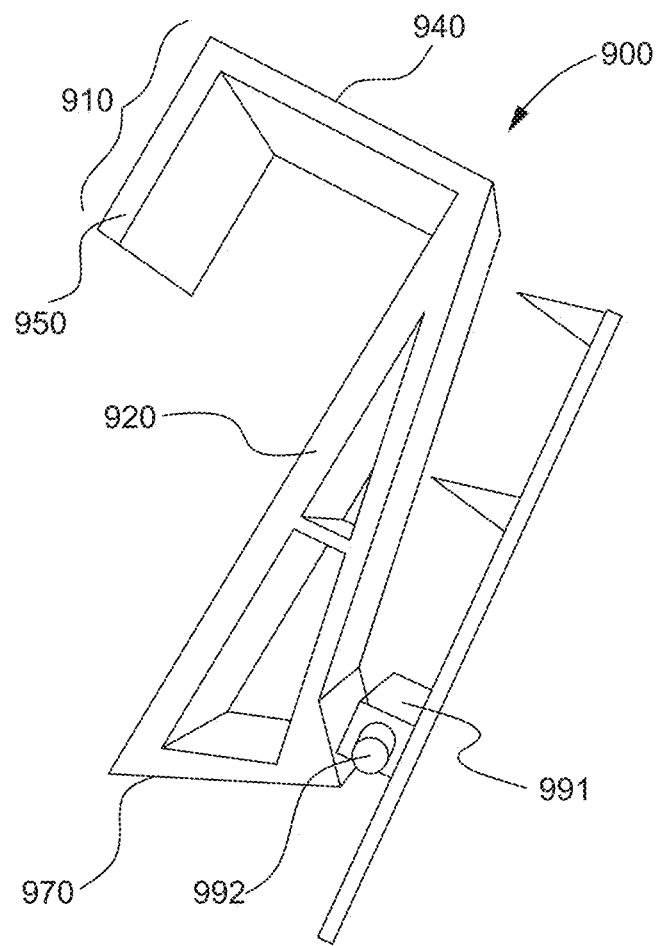
FIG. 9D shows a side view of the device holder shown in FIG. 9A when the device holder is re-coupled in a storage configuration.

FIGS. 9C and 9D show that the base 930 may be decoupled, rotated and then re-coupled to the support wall 920. Accordingly, the base 930 may be coupled against the inner surface of the support wall 920 (i.e., the side of the support wall 920 that faces towards the base 930). Alternatively, the base 930 may be rotated at the hinge mechanism 990 without decoupling the support wall 920 and the base 930. In alternative embodiments, the hinge mechanism 990 may not be a hinge, but any mechanism for removably coupling the support wall 920 and the base 930.

Figure 10A:
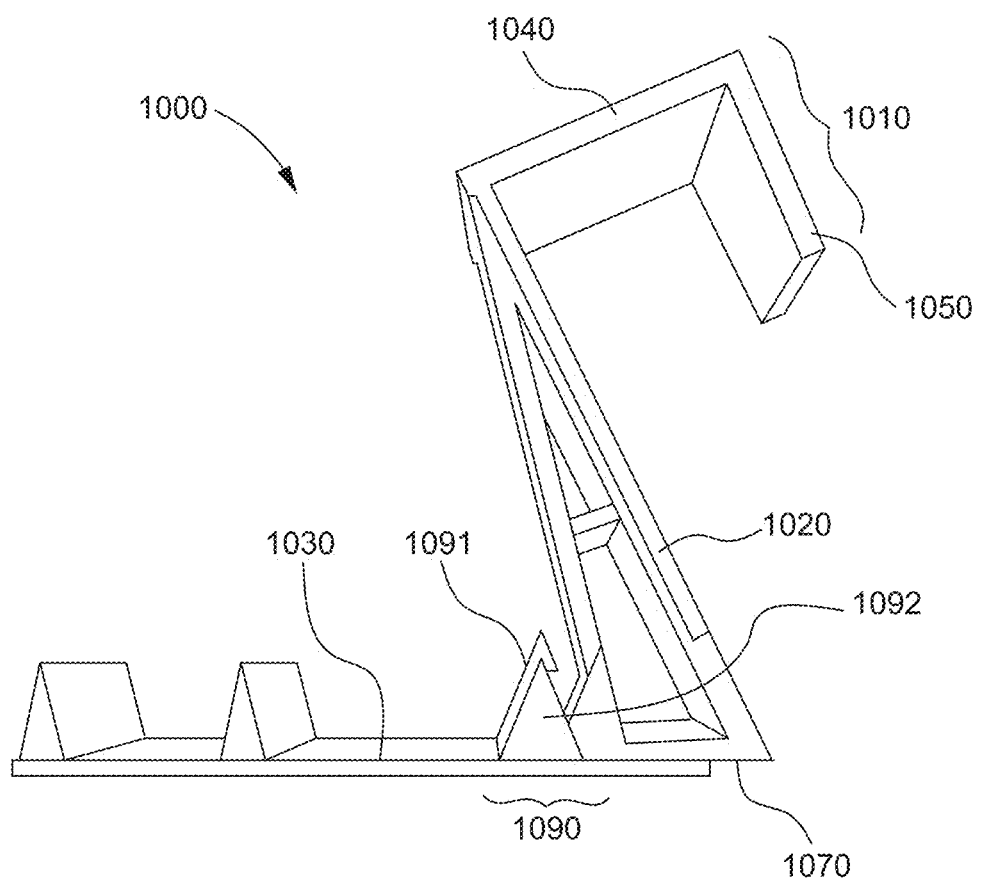
FIG. 10A shows a device holder according to a tenth embodiment of the present invention in a coupled configuration.

FIG. 10A shows a side view of a device holder 1000 according to a tenth embodiment. The device holder 1000 has a connector 1010, a support wall 1020, and a base 1030.

The base 1030 is removably coupled to the support wall 1020 with a linking mechanism 1090. The linking mechanism 1090 comprises an insert 1092 and a receiver 1091. The receiver 1091 forms a cavity that is shaped and sized to receive the insert 1092. To couple the support wall 1020 to the base 1030, the insert 1092 is inserted into the receiver 1091. As shown in FIG. 10A, the insert 1092 is secured inside the receiver 1091 by an upper ledge or lip of the receiver 1091 that hangs down to partially encase the side the insert 1092.

Figure 10B:
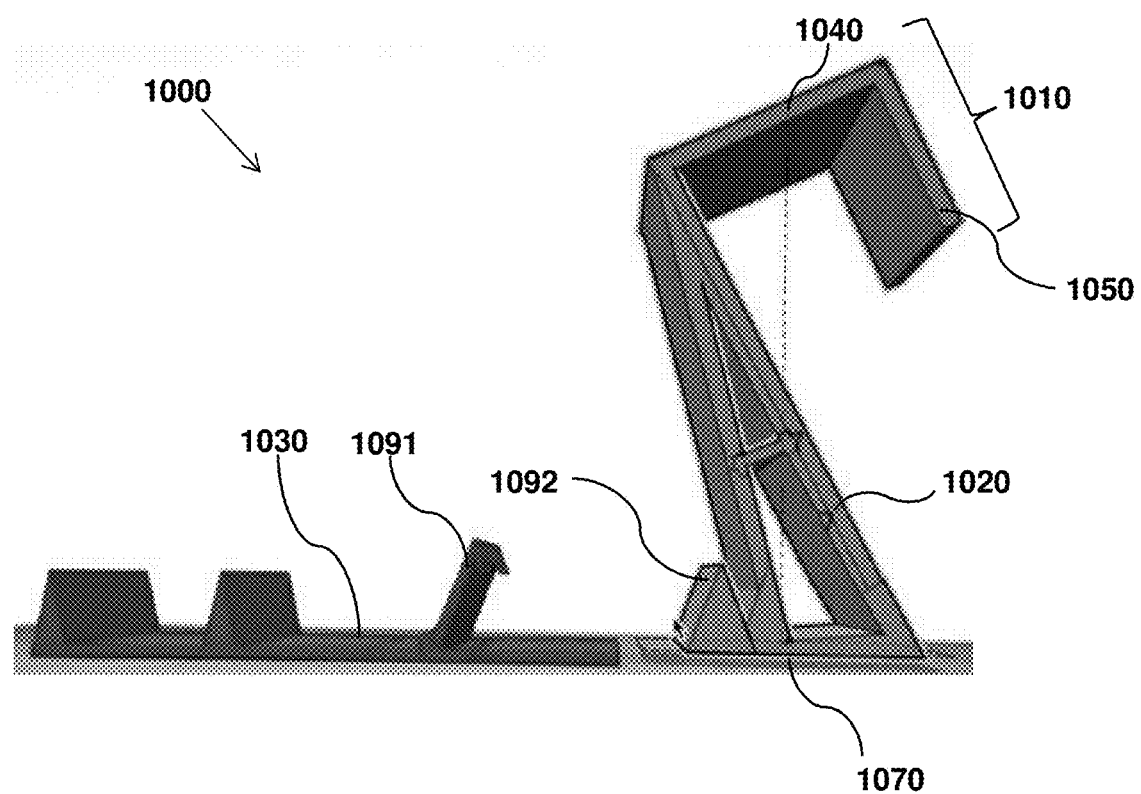
FIG. 10B shows the device holder shown in FIG. 10A in a decoupled configuration.

FIG. 10B shows a side view of the decoupled device holder 1000. The support wall 1020 and the base 1030 are decoupled at the linking mechanism 1090. In a preferred embodiment, the linking mechanism 1090 allows for the coupling and decoupling of the support wall 1020 and the base 1030. In further embodiments, the top portion 1040 may be coupled to the support wall 1020 and/or the lip portion 1050 with a linking mechanism 1090. The linking mechanism 1090 may be, without limitation, a clasp, clamp, latch, button, snaps, hook and loop, or magnetic clip.

Figure 11:
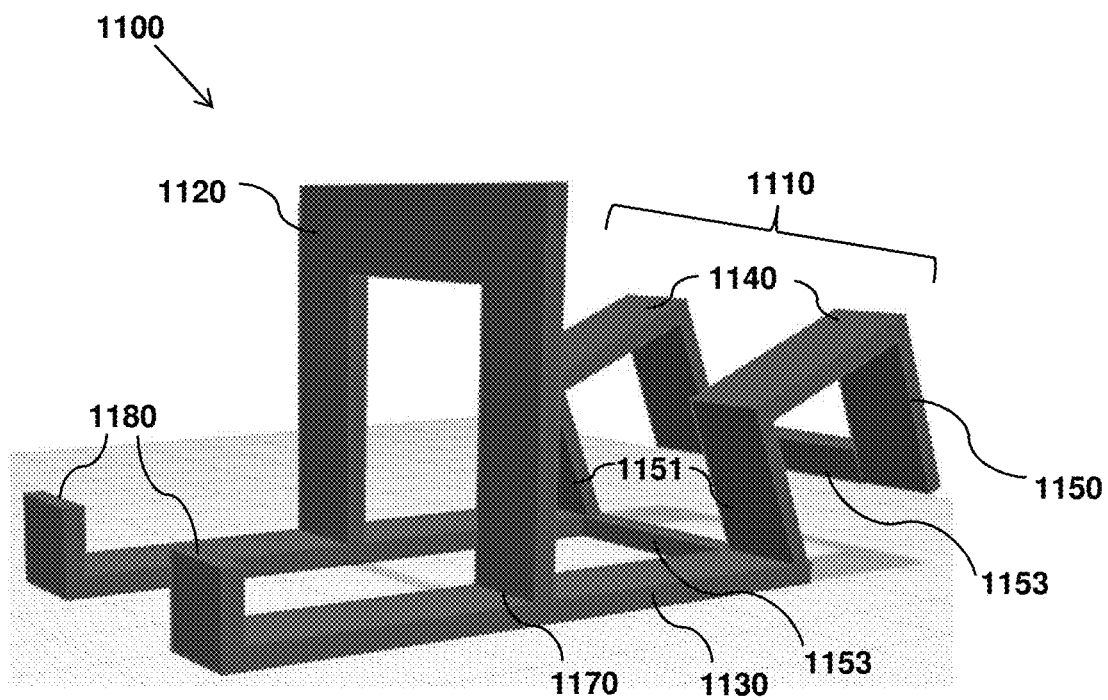
FIG. 11 shows a perspective view of a device holder according to an eleventh embodiment of the present invention.

FIG. 11 shows a perspective view of a device holder 1100 according to an eleventh embodiment. The device holder 1100 has a connector 1110, a support wall 1120 and a base 1130.

The connector 1110 comprises a top portion 1140 that is coupled to a first lip portion 1150 at one end and to a second lip portion 1151 at the other end. The first lip portion 1150 and the second lip portion 1151 extends away from the top portion 1140 in generally the same direction as the support wall 1120, such that the support wall 1120, the first lip portion 1150, the second lip portion 1151 are facing each other. Accordingly, the top portion 1140, the first lip portion 1150 and the second lip portion 1151 collectively form a channel. The channel is shaped and sized to fit over an object or surface to hang or hook the device holder 1100 on. The second lip portion 1151 is coupled to one end of the base 1130. The base 1130 may angle away from the second lip portion 1151 at either an acute or obtuse angle with the second lip portion 1151.

As seen in FIG. 11, the top portion 1140, the first lip portion 1150 and the second lip portion 1151 are each comprised of two (2) parallel, planar bars that form a gap between the two (2) parallel bars. The width of each of the parallel bars of the connector 1110 is the same. The distance between the two (2) parallel bars is also the same for each of the three (3) parts of the connector 1110. In other embodiments, the width of and distance between the parallel bars may vary. In FIG. 11, a support bar 1153 extends between the bottom ends of the two (2) parallel bars of the first lip portion 1150. Additionally, a support bar 1153 extends between the two (2) parallel bars of the second lip portion 1151 where the second lip portion 1151 is coupled to the base 1130. In other embodiments, there may be any number of support bars 1153 extending between the two (2) parallel bars at various points on the top portion 1140, the first lip portion 1150 and the second lip portion 1151. Alternatively, the top portion 1140, the first lip portion 1150, and/or the second lip portion 1151 may be uniform walls.

The base 1130 in FIG. 11 is comprised of two (2) parallel, planar bars that are continuous with the parallel bars of the second lip portion 1151. Alternatively, the base 1130 may be a uniform surface. The two (2) parallel bars of the base 1130 form a gap between the two (2) parallel bars. A support element 1180 protrudes from the front surface of the two (2) parallel bars (i.e. the side that faces the second lip portion 1151) at the end opposite to the second lip portion 1151. The support wall 1120 is coupled to the front surface of the base 1130 (i.e. the side that faces the second lip portion 1151) at a point that is between the two ends of the base 1130. The support wall 1120 may be coupled to the base 1130 at a perpendicular or near perpendicular angle. The support wall 1120 in FIG. 11 forms two (2) parallel, planar bars that each protrude from the two (2) parallel bars of the base 1130. The two (2) parallel bars of the support wall 1120 are coupled at their top ends. Alternatively, the support wall 1120 may be a uniform wall. In further embodiments, there may be one or more support bars 1153 extending between the two (2) parallel bars of the base 1130 and/or the support wall 1120. In further embodiments, the width of and the distance between the two (2) parallel bars of the base 1130 and/or the support wall 1120 may vary.

The section of the base 1130 extending from the outer surface of the support wall 1120 (i.e. the side that faces away from the connector 1110) may angle away from the support wall 1120 at either an acute or obtuse angle with the support wall 1120. Alternatively, the section of the base 1130 between the support wall 1120 and the connector 1110 may angle away from the support wall 1120 at either an acute or obtuse angle with the support wall 1120. In a further embodiment, the support wall 1120, the base 1130, the top portion 1140, the first lip portion 1150, and the second lip portion 1151 are operatively coupled to each other with hinge mechanisms, such that the device holder 1100 is capable of folding flat for easier storage and transport. Alternatively, the five (5) parts of the device holder 1100 are coupled to each other with linking mechanisms, such that each part is capable of decoupling from each other. A skilled artisan would understand that the five (5) parts of the device holder 1100 may be coupled to each other by a combination of hinge and linking mechanisms.

Figure 12:
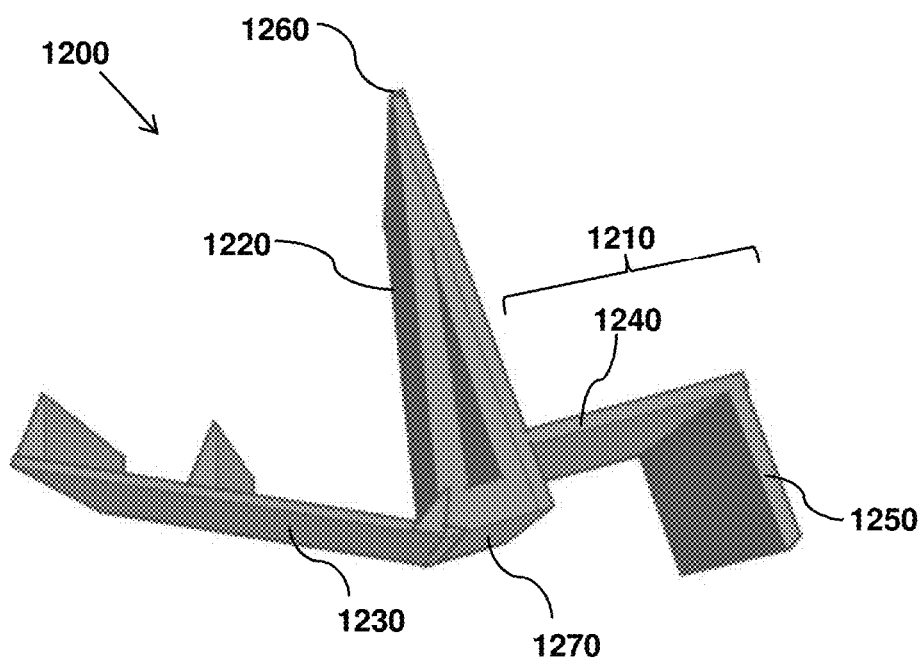
FIG. 12 shows a side view of a device holder according to a twelfth embodiment of the present invention.

FIG. 12 shows a side view of a device holder 1200 according to a twelfth embodiment. The device holder 1200 has a connector 1210, a support wall 1220 and a base 1230.

The connector 1210 comprises a top portion 1240 that is coupled to the side of the support wall 1220 facing away from the base 1230. The top portion 1240 protrudes out from a point between the top end 1260 and the bottom end 1270 of the support wall 1220. The top portion 1240 is coupled to a lip portion 1250. The top portion 1240, the lip portion 1250 and the support wall 1220, collectively, form a channel when the top portion 1240 is coupled to a point between the top end 1260 and the bottom end 1270 of the support wall. Alternatively, the top portion 1240 may be coupled to the bottom end 1270 of the support wall 1220 such that the top portion 1240 and the bottom end 1270 of the support wall form a level, planar surface.

In use, the PED 210 rests against the support element 1280 at the end of the base 1230. As such, various sizes of a PED are contemplated by the present invention for use with the device holder, including larger devices such as a tablet.

Figure 13A:
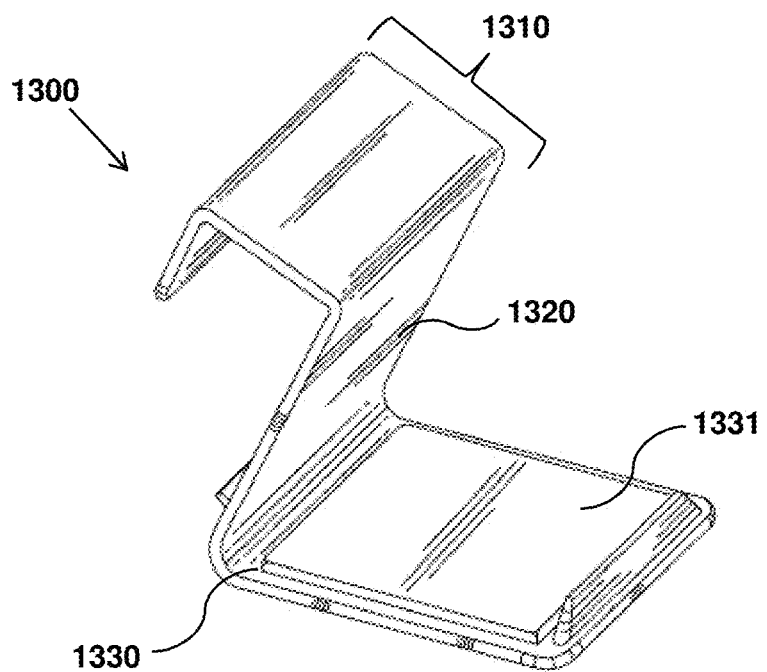
FIG. 13A shows a perspective view of a device holder according to a thirteenth embodiment of the present invention.

FIG. 13A shows a perspective view of a device holder 1300 according to a thirteenth embodiment. The device holder 1300 has a connector 1310, a support wall 1320 and a base 1330.

Figure 13B:
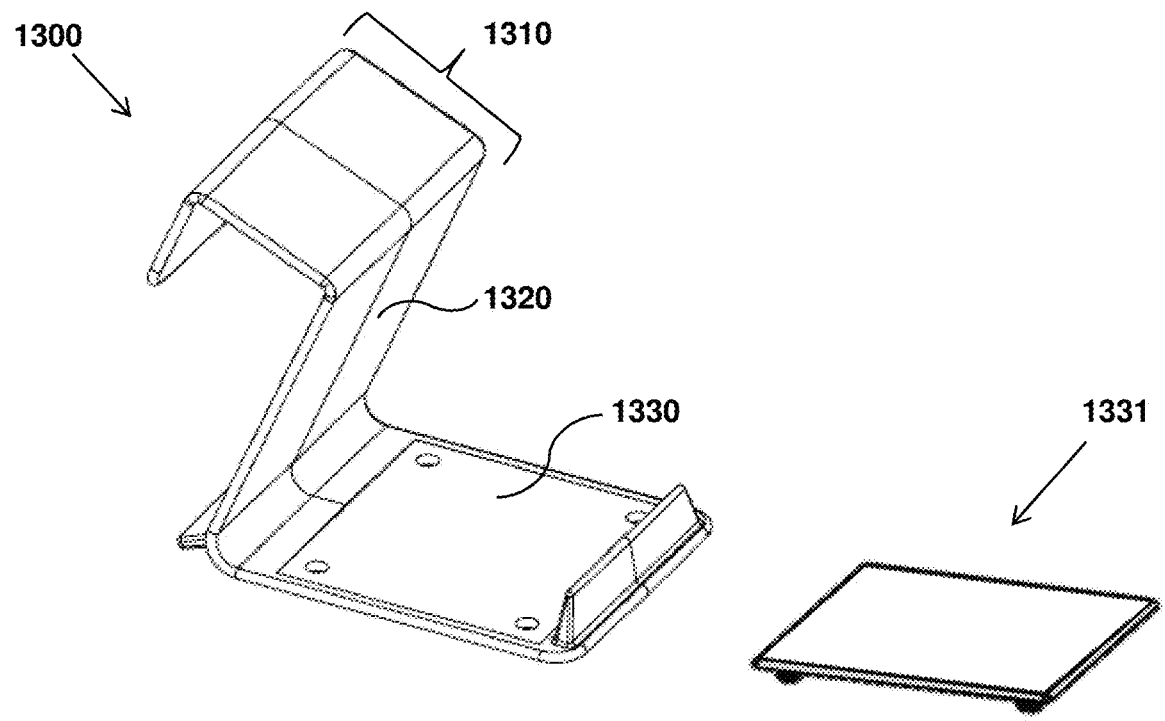
FIG. 13B shows a perspective view of the device holder shown in FIG. 13A in a decoupled configuration.

As shown in FIG. 13B, a rubber pad 1331 is removably secured to the front surface of the base 1330 to assist in gripping a PED 210 (not shown). In a further embodiment, the bottom surface (not shown) of the base 1330 may be coated with a non-slip adhesive spray, a rubber pad, or rubber grips or feet to assist the device holder 1300 in gripping to the surface it is rested upon.

Figure 13C:
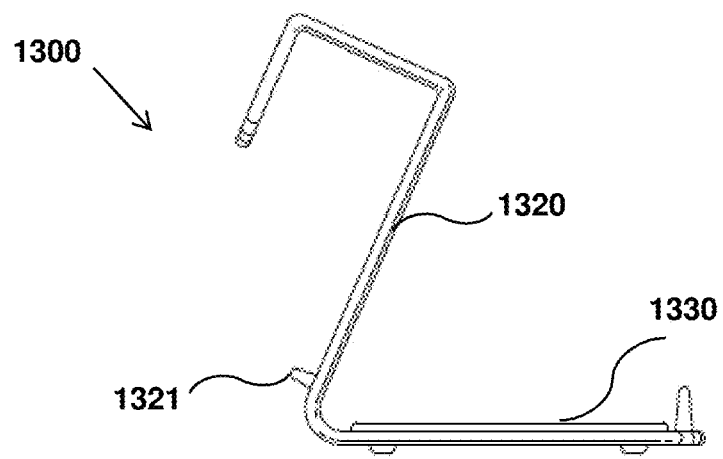
FIG. 13C shows a side view of the device holder shown in FIG. 13A.

FIG. 13C shows a side view of the device holder 1300. The outer surface of the support wall 1320 (i.e., the side of the support wall 1320 that faces away from the base 1330) has a ridge 1321. When the channel is hooked onto a surface (not shown), the ridge 1321 may rest against the surface.

Figure 14A:
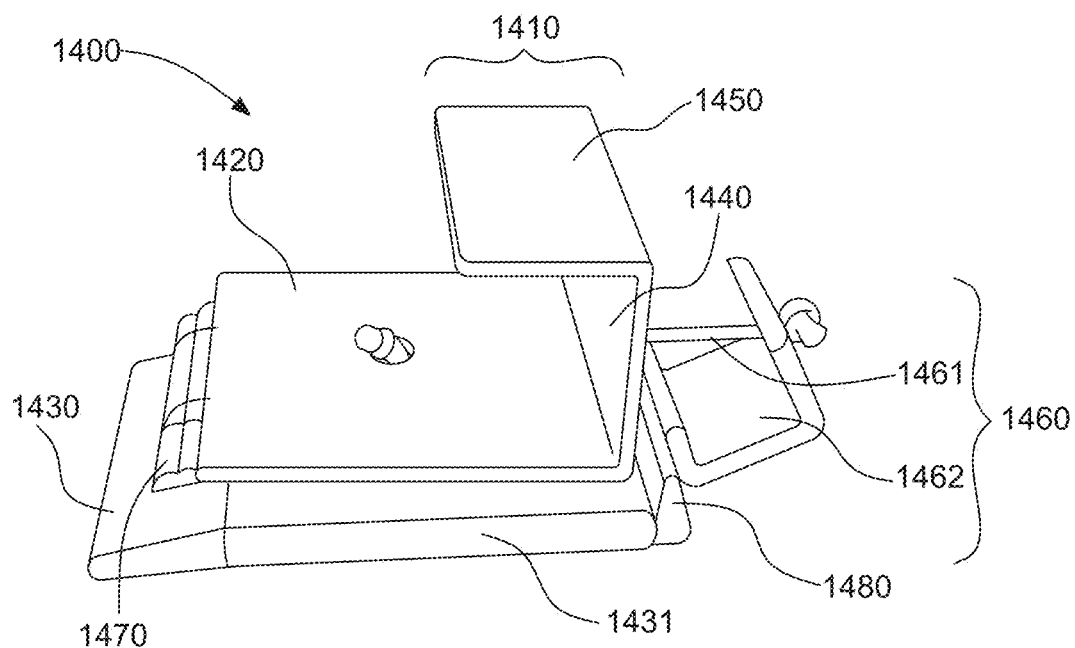
FIG. 14A shows a side view of a device holder according to a fourteenth embodiment of the present invention in a folded configuration.

FIG. 14A shows a side view of a device holder 1400 in a closed position according to a fourteenth embodiment. The device holder 1400 has a connector 1410, a support wall 1420, and a base 1430.

The connector 1410 comprises a top portion 1440 that is coupled to and protrudes out from the support wall 1420 and a lip portion 1450. The lip portion 1450 is coupled to the top portion 1440 and protrudes away from the top portion 1440 in the same general direction as the support wall 1420. Similarly to device holder 100, the support wall 1420, top portion 1440, and the lip portion 1450, collectively, form a channel for fitting over or hanging from a surface.

The support wall 1420 further includes a securing means 1460 that is coupled to the inner surface of the support wall 1420 (i.e., the side of the support wall 1420 that faces towards the base 1430). However, the skilled artisan would understand that the securing means 1460 may be secured to any part of the connector 1410 (i.e., the top portion 1440 and the lip portion 1450), the support wall 1420, or the base 1430, as long as the securing means 1460 secures the PED 210 to the device holder 1400. In a preferred embodiment, the securing means 1460 does not impede the channel's ability to fit over or hang from a surface.

The securing means 1460 is comprised of a connecting member 1461 and a hook or clip 1462. In FIG. 14A, the connecting member 1461 is removably coupled to the support wall 1420 and the hook or clip 1462 is coupled to the connecting member 1461. In this embodiment, the connecting member 1461 is elastic. However, the connecting member 1461 may be inelastic if the length of the connecting member 1461 may be adjusted to secure the PED 210 to the device holder 1400, such as in FIGS. 15A and 15B. The hook or clip 1462 is shaped and sized to removably couple to or engage with the PED 210.

The support wall 1420 may be operatively coupled to the base 1430 with a hinge mechanism 1470. When the support wall 1420 and the base 1430 are coupled with a hinge mechanism 1470, the support wall 1420 may fold flat against the front surface of the base 1430, as shown in FIG. 14A.

The base 1430 may be removably coupled to the support wall 1420 such that different sized bases 1430 may be used. A wider and/or longer base 1430 may be used to accommodate different sizes of PEDs 210, such as a tablet, an e-reader, a notebook computer, or a laptop computer.

The hinge mechanism 1470 may be, without limitation, a butt hinge, butterfly hinge, flush hinge, barrel hinge, concealed hinge, continuous hinge, piano hinge, pivot hinge, ball bearing hinge, plain bearing hinge, or wraparound hinge.

The base 1430 shown in FIG. 14A is a planar surface with a single support element 1480 protruding from the base 1430. However, a skilled artisan would understand that the base 1430 does not need to be a planar surface. Furthermore, the base 1430 may have more than one support element 1480. The support element 1480 protrudes out from the front surface of the base 1430 (i.e., the side that faces the support wall 1420), such that the PED 210 may rest against the support element 180. However, the support element 1480 may also be one or more divots or slots that the PED 210 may fit inside.

The base 1430 may also have a silicone non-slip layer 1431 that covers the front surface of the base 1430 (i.e., the side that faces the support wall 1420) and/or the bottom surface of the base 1430 (i.e., the side that faces away from the support wall 1420). The silicone non-slip layer 1431 may have ridges that extend from one side of the front surface of the base 1430 to the other side. These ridges provide additional support to the PED to prevent the PED from sliding on the base 1430.

Figure 14B:
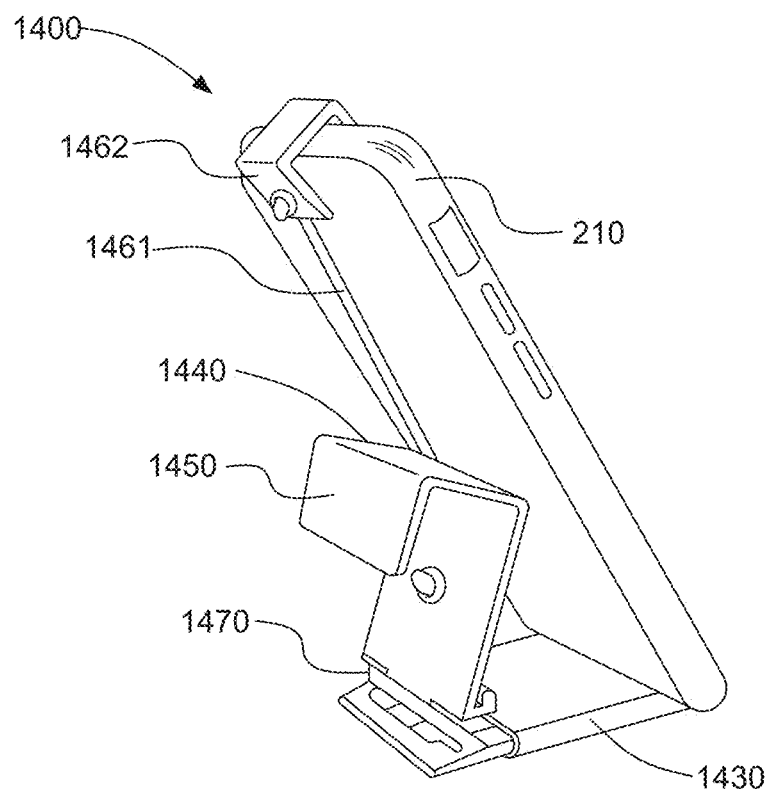
FIG. 14B shows a side perspective view of the device holder shown in FIG. 14A in an unfolded configuration and showing a PED being supported.

FIG. 14B shows the device holder 1400 in an open position and in use with a PED 210. As may be seen, the connecting member 1461 is stretched to fit the hook or clip 1462 over the PED 210. Once the hook or clip 1462 is removably coupled to the PED 210, the elastic connecting member 1461 rebounds and applies downward pressure on the PED 210 to hold the PED 210 in the device holder 1400.

Figure 15A:
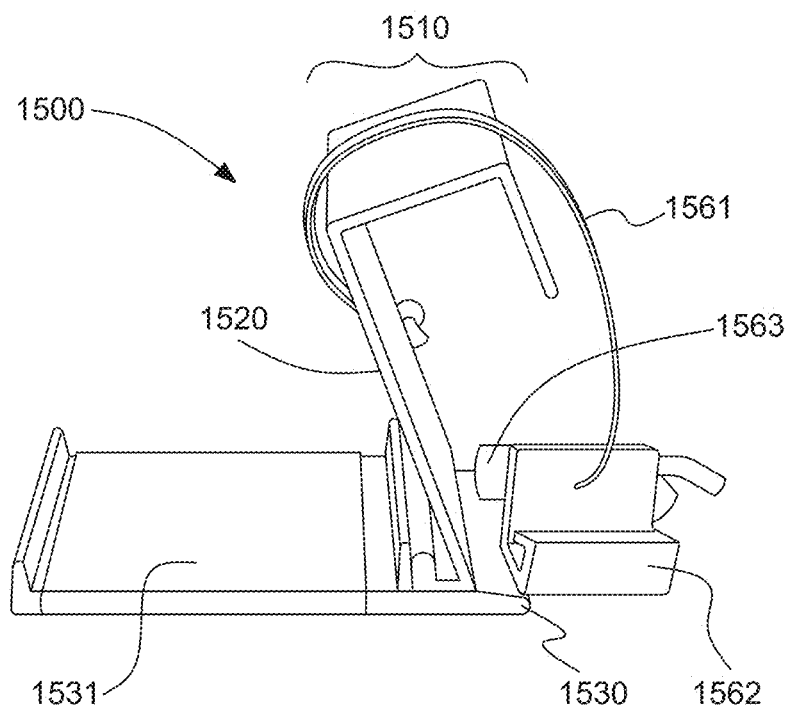
FIG. 15A shows a side view of a device holder according to a fifteenth embodiment of the present invention in an unfolded configuration.

FIG. 15A shows a side view of a device holder 1500 in an open position according to a fifteenth embodiment. The device holder 1500 has a connector 1510, a support wall 1520, and a base 1530.

Similar to device holder 1400, the device holder 1500 has a securing means 1560. However, securing means 1560 differs from the securing means shown in FIGS. 14A and 14B in that the securing member 1560 is adjustable. The securing member 1560 is comprised of a connecting member 1561, a hook or clip 1562 and an adjustment element 1563.

The securing member 1560 is removably coupled to the device holder 1500. In this embodiment, there is a keyhole in the support wall 1520 that the connecting member 1561 is thread through to couple the securing member 1560 to the support wall 1520. A barb or knot is placed at the free end of the connecting member 1561 to keep the securing member 1560 secured to the device holder 1500.

Figure 15B:
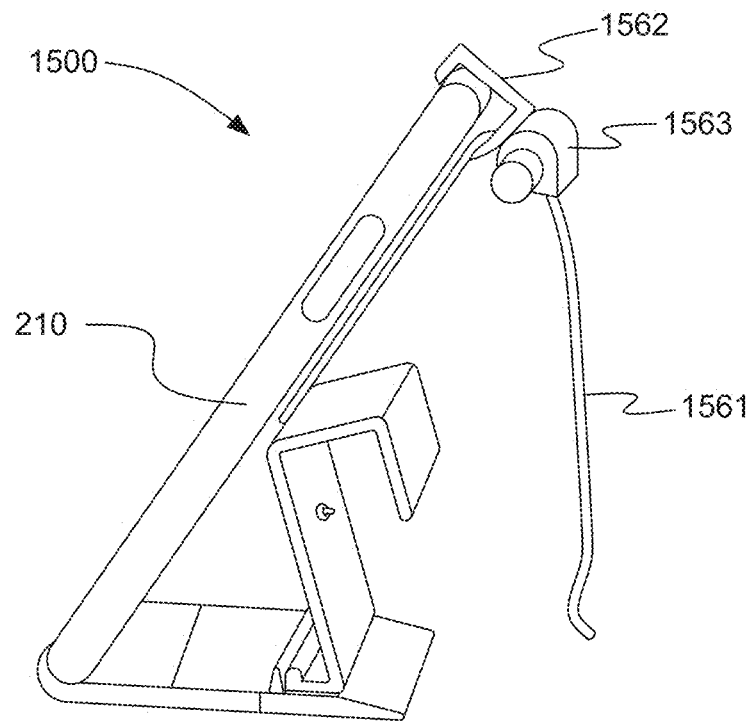
FIG. 15B shows a side view of the device holder shown in FIG. 15A in an unfolded configuration and showing a PED being supported.

FIG. 15B shows the device holder 1500 in an open position and in use with a PED 210. The connecting member 1561 may be elastic or inelastic. When the PED 210 is placed on the device holder 1500, the hook or clip 1562 is removably coupled to the PED 210 and the adjustment element 1563 is tightened to apply downward pressure on the PED 210 to hold the PED 210 in the device holder 1500. The adjustment element 1563 may be, without limitation, a spring fastener, a cord lock, or toggle stopper.

Figure 16A:
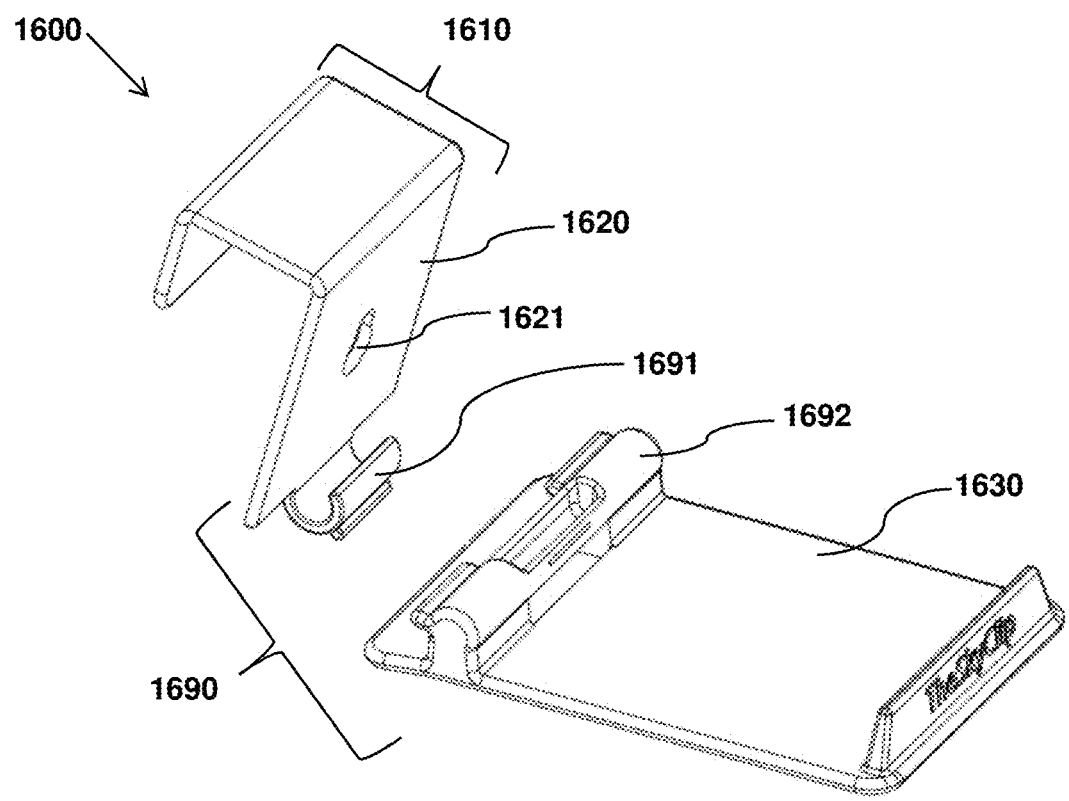
FIG. 16A shows a perspective view of a device holder according to a sixteenth embodiment of the present invention in a decoupled configuration.

FIG. 16A shows a perspective view of a device holder 1600 according to a sixteenth embodiment in a decoupled position. The device holder 1600 has a connector 1610, a support wall 1620 and a base 1630.

The support wall 1620 has a keyhole 1621 that is for removably coupling to a securing member, such as securing member 1460 or 1560.

The support wall 1620 is coupled to the base 1630 with a removable hinge mechanism 1690. The hinge mechanism 1690 is comprised of a barrel 1691 and a pin 1692. The barrel 1691 forms a cavity that is shaped and sized to receive the pin 1692. The pin 1692 is held inside the barrel 1691 such that the barrel 1691 may rotate around the pin 1692. The hinge mechanism 1690 allows the support wall 1620 to fold against the front surface of the base 1630 (i.e., the side that faces the support wall 1620).

In the embodiment shown in FIG. 16A, the barrel 1691 forms part of the support wall 1620 and the pin 1692 forms part of the base 1630, such that the support wall 1620 and the base 1630 are removably coupled to each other. The pin 1692 has a small pin flange 1693 that provides resistance within the barrel 1691 when the support wall 1620 is in an upright (open) position. The small flange 1693 provides friction for approximately the last 10 degrees of rotation when the support wall 1620 is being moved into the upright (open) position. However, any portion of the barrel 1691 or the pin 1692 may be provided with a flange or a coating that provides friction to facilitate keeping the base 1630 at a desired angle from the support wall 1620 when the device 1600 is in an open position.

Figure 16B:
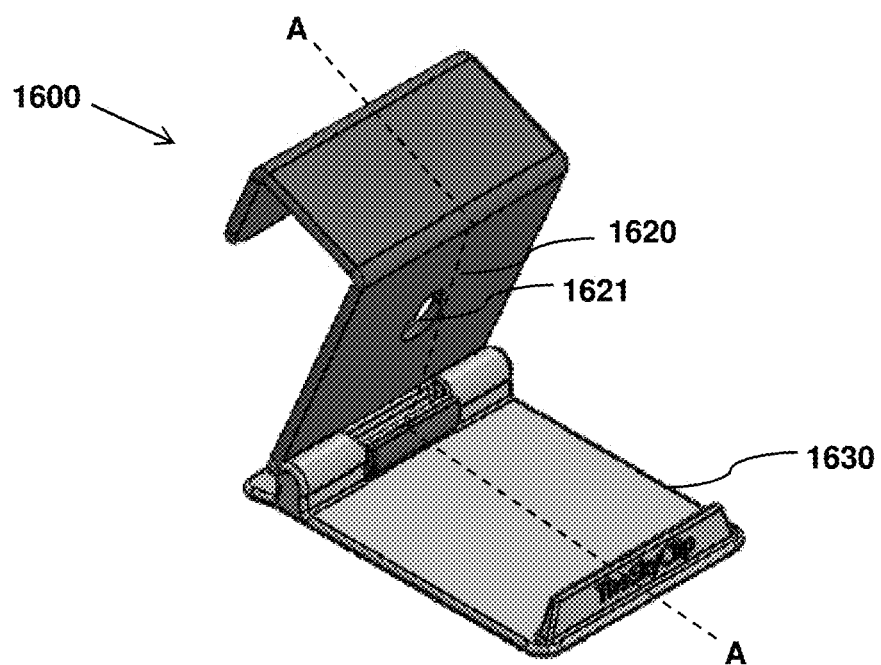
FIG. 16B shows a perspective view of the device holder shown in FIG. 16A in a coupled configuration.

FIG. 16B shows a perspective view of the device holder 1600 when the support wall 1620 and the base 1630 are coupled together.

Figure 16C:
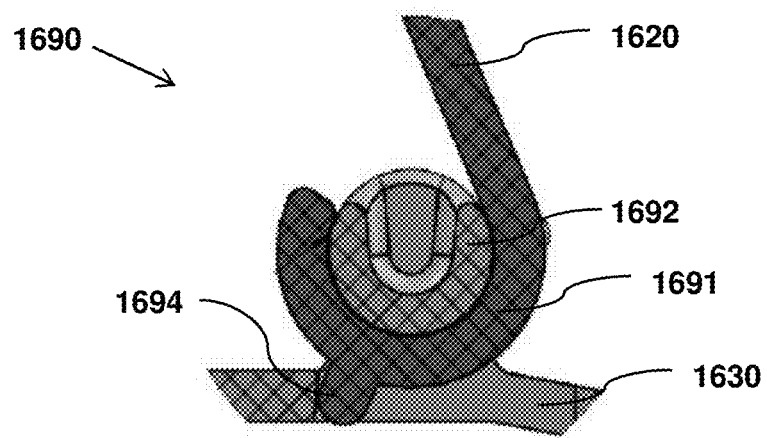
FIG. 16C shows an enlarged, cross-sectional view of the hinge mechanism of the device holder according to the sixteenth embodiment taken along line A-A of FIG. 16B.

FIG. 16C shows an enlarged, cross-sectional side view of the hinge mechanism 1690 of the device holder 1600. As may be seen, the barrel 1691 is sized and shaped to receive the pin 1692. In this embodiment, the barrel 1691 further includes a barrel flange 1694 that prevents the support wall 1620 from folding forward towards the bottom surface of the base 1630.

Figure 17:
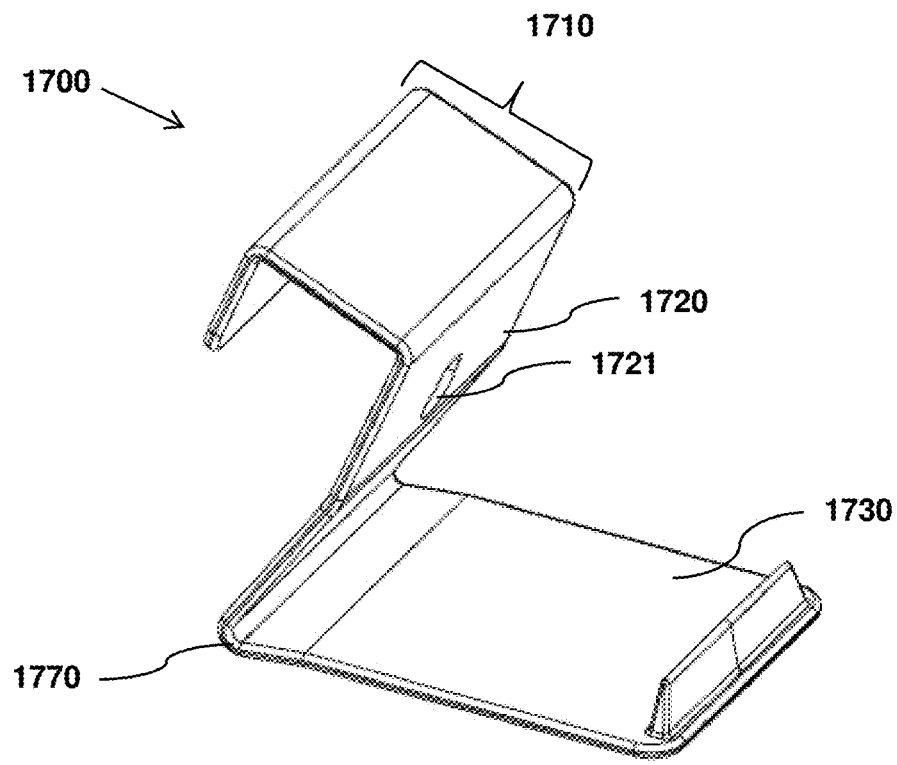
FIG. 17 shows a perspective side view of a device holder according to a seventeenth embodiment of the present invention.

FIG. 17 shows a perspective side view of a device holder 1700 according to a seventeenth embodiment of the present invention. As may be seen, the device holder 1700 has a connector 1710, a support wall 1720 and a base 1730.

The device holder 1700 differs from the other embodiments contained herein in that the support wall 1720 is angled near the bottom end 1770 of the support wall 1720 to provide more stability for when the device holder 1700 is used as a freestanding device holder. Accordingly, the support wall 1720 does not form a triangular prism, as in other embodiments.

The support wall 1720 has a keyhole 1721 that is for removably coupling to a securing member, such as securing member 1460 or 1560. Furthermore, the base 1730 may be covered with a silicone non-slip pad to provide additional support to the bottom edge of the PED 210 being used with the device. The silicone non-slip pad may optionally include ridges to further support the PED 210.

Figure 18:
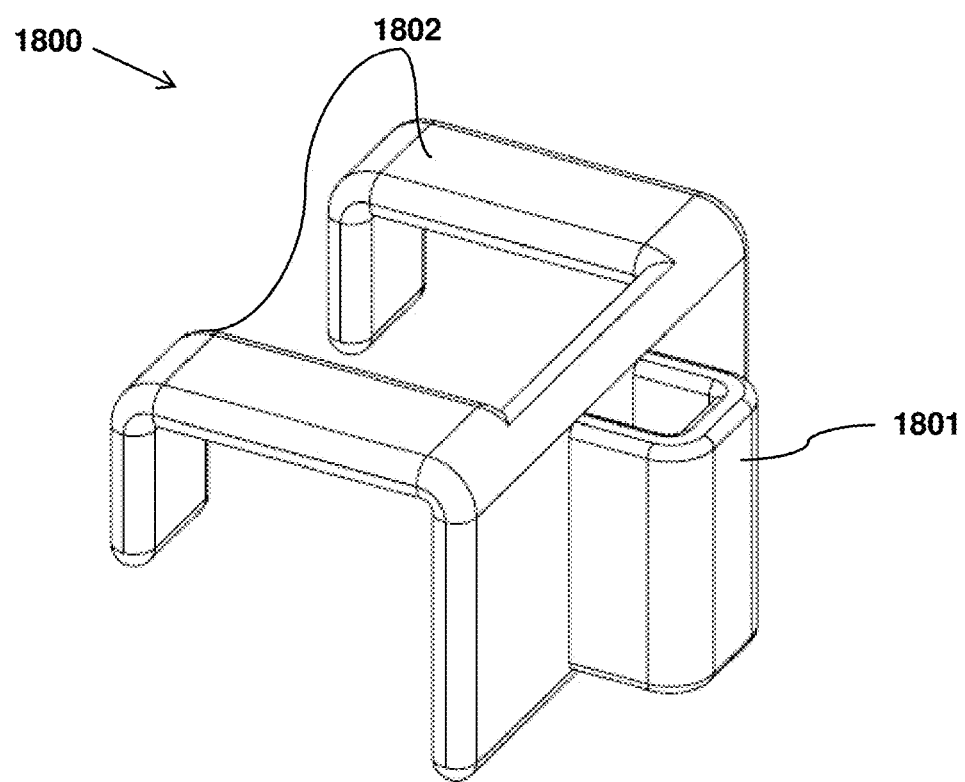
FIG. 18 shows a perspective view of a hook or clip according to an eighteenth embodiment of the present invention.

FIG. 18 shows an enlarged, perspective view of a hook or clip 1800 according to another embodiment. The hook or clip 1800 has a channel 1801 for coupling to a connecting member, such as connecting member 1461 or 1561. The hook or clip 1800 has at least one hook 1802 that is sized and shaped to fit over or engage with a PED 210. In FIG. 18, the hook or clip 1800 has two (2) hooks 1802 that are sized and shaped to engage with a PED 210.

A skilled artisan would understand that the support walls of any of the above described device holders may include a keyhole, such as keyhole 1621, for coupling the connecting member 1461 or 1561 to the securing member 1460 or 1560 and thus securing the securing member 1460 or 1560 to the device holder.

A skilled artisan would understand that the top portion of any of the above described connectors may be extendable such that the entire connector portion may be reshaped and resized to fit over multiple surfaces. Additionally, the support wall and/or the base in any of the above embodiments may be adjustable and extendable to support different sizes of PEDs.

The above embodiments contemplate a connector that is shaped and sized to hang on a surface. However, any of the above embodiments may have a connector that connects with a surface in another manner, such as with hook and loops (i.e., VELCRO™), magnets, loops, round hangers, clips, etc. The device holder may be comprised of plastic, wood, metal, and/or rubber.

A person understanding this invention may now conceive of alternative structures and embodiments or variations of the above all of which are intended to fall within the scope of the invention as defined in the claims that follow.

We claim:

1. A device for holding a portable electronic device, the device comprising:
   a connector;
   a support wall having a first end and a second end, wherein the connector is coupled to the first end of the support wall;
   a base having a first base end and a second base end, wherein the first base end of the base is coupled to the second end of the support wall such that the base is extending in an opposite direction from the connector;
   at least one support element, wherein the at least one support element is coupled to the base on a front face, the front face being a surface facing the support wall; and
   a securing means comprising
   a connecting member having a first end and a second end, the first end being removably coupled to at least one of: the connector; the support wall and the base; and
   a fastener element coupled to the connecting member between the first end and the second end, the fastener element being for engaging with and securing the portable electronic device.

2. The device according to claim 1, further including a first hinge mechanism for operatively coupling the second end of the support wall to the first base end of the base.

3. The device according to claim 2, wherein the first hinge mechanism is adjustable such that a first angle between the base and the support wall is adjustable.

4. The device according to claim 2, wherein the first hinge mechanism is a removable mechanism such that the support wall and the first end of the base are capable of decoupling.

5. The device according to claim 1, wherein the support wall forms a triangular prism having an acute angle at or near the first end of the support wall.

6. The device according to claim 5, wherein the triangular prism has a hollow interior.

7. The device according to claim 6, wherein the hollow interior has at least one support bar that extends across the interior of the hollow interior.

8. The device according to claim 5, wherein the connecting member is coupled to the triangular prism of the support wall.

9. The device according to claim 5, wherein connecting member is coupled to the device at the first end of the support wall.

10. The device according to claim 1, wherein the connector extends across and is coupled to a longitudinal edge of the first end of the support wall.

11. The device according to claim 1, wherein the at least one support element extends across a width of the front face.

12. The device according to claim 1, wherein at least a portion of the front face of the base is an adhesive or non-slip surface.

13. The device according to claim 1, wherein at least a portion of a bottom surface of the base is an adhesive or non-slip surface.

14. The device according to claim 1, wherein the device has at least two support elements, wherein the at least two support elements are spaced to allow the portable electronic device to rest upon the base and lean against the support wall at different angles.

15. The device according to claim 1, wherein the connector is one of: at least one hook and at least one hanger.

16. The device according to claim 1, further comprising an adjustment element coupled to the second end of the connecting member, the adjustment element being for adjusting the position of the fastener element relative to the first end of the connecting member to secure the portable electronic device to the device holder.

17. The device according to claim 1, wherein the connecting member is elastic.

18. The device holder according to claim 1, wherein the fastener element is one of: a hook and a clip.

19. The device holder according to claim 1, wherein the connecting member is removably coupled to the support wall through a keyhole in the support wall.

20. The device holder according to claim 1, further comprising a pad removably coupled to the front face of the base.

* * * * *